(12) United States Patent
Wang et al.

(10) Patent No.: US 12,218,888 B2
(45) Date of Patent: Feb. 4, 2025

(54) COVERAGE ENHANCEMENT FOR WIRELESS ENERGY TRANSFER

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 17/654,757

(22) Filed: Mar. 14, 2022

(65) Prior Publication Data

US 2023/0291535 A1 Sep. 14, 2023

(51) Int. Cl.
*H04L 5/14* (2006.01)
*H04W 72/1273* (2023.01)

(52) U.S. Cl.
CPC ....... *H04L 5/1438* (2013.01); *H04W 72/1273* (2013.01)

(58) Field of Classification Search
CPC ....... H04L 5/1438; H04L 5/0053; H04L 5/14; H04L 5/0094; H04W 72/1273
See application file for complete search history.

(56) References Cited

U.S. PATENT DOCUMENTS

| 2012/0212071 | A1* | 8/2012 | Miyabayashi | H02J 50/05 307/104 |
| 2013/0341410 | A1* | 12/2013 | McWilliams | G06K 19/07749 235/492 |
| 2018/0109150 | A1* | 4/2018 | Khan | H02J 50/20 |
| 2022/0346022 | A1* | 10/2022 | Butt | H04W 52/0251 |
| 2022/0352751 | A1* | 11/2022 | Elshafie | H02J 50/23 |
| 2023/0117363 | A1* | 4/2023 | Abotabl | H04L 1/1812 307/104 |

(Continued)

FOREIGN PATENT DOCUMENTS

WO WO-2018222491 A1 * 12/2018 ............. H02J 50/20

OTHER PUBLICATIONS

International Search Report and Written Opinion—PCT/US2023/013862—ISA/EPO—May 25, 2023.

(Continued)

*Primary Examiner* — Tejis Daya
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for wireless energy transfer. A network entity may obtain a report indicative of a capability of a UE to transmit an energy transfer signal on at least one of a downlink band of an FDD configuration or at least one of a downlink symbol or a downlink slot of a TDD configuration, and output at least one of the TDD configuration or the FDD configuration for the energy transfer signal. The TDD configuration may include the at least one of the downlink symbol or the downlink slot and the FDD configuration may include the downlink band. The UE may receive the configuration for downlink resources in at least one of time or frequency and transmit an energy transfer signal on one or more of the downlink resources.

30 Claims, 17 Drawing Sheets

(56) References Cited

U.S. PATENT DOCUMENTS

2023/0403697 A1* 12/2023 Wang .................. H02J 50/001

OTHER PUBLICATIONS

Ko Y., et al., "Uplink Time Scheduling With Power Level Modulation Scheme in Wireless Powered Communication Networks", IEEE Access, vol. 7, Feb. 1, 2019 (Feb. 1, 2019), pp. 11187-11194, XP011707670, DOI: 10.1109/ACCESS.2018.2890721, figure 1, sections I, II.

* cited by examiner

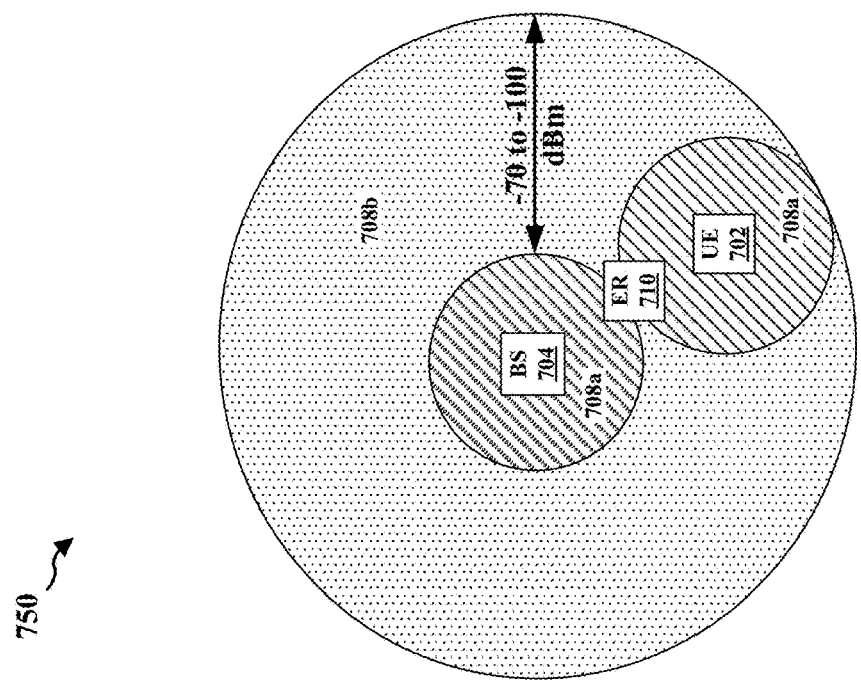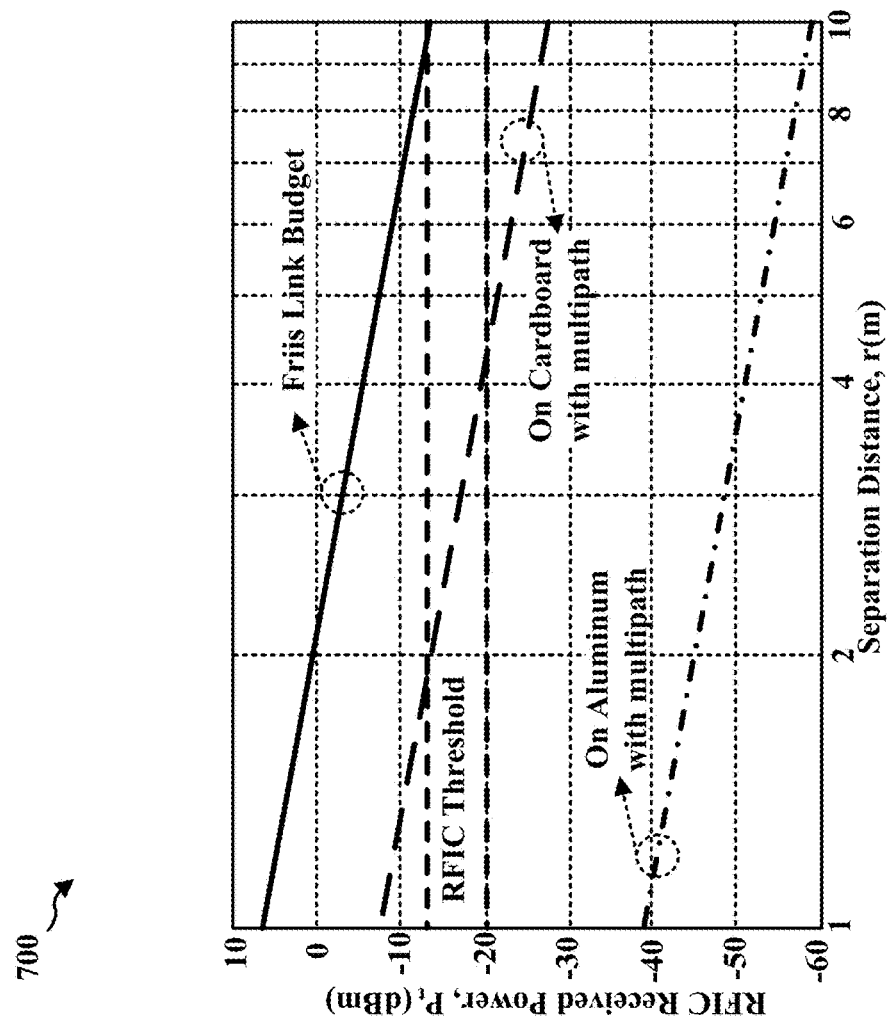
FIG. 7

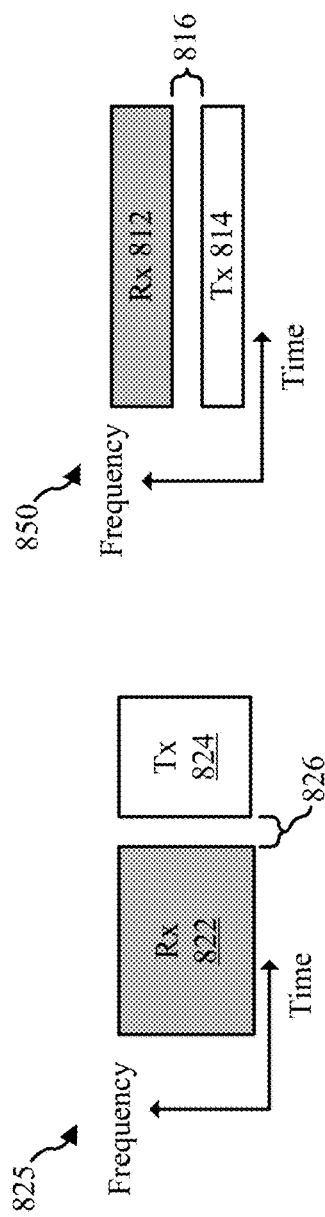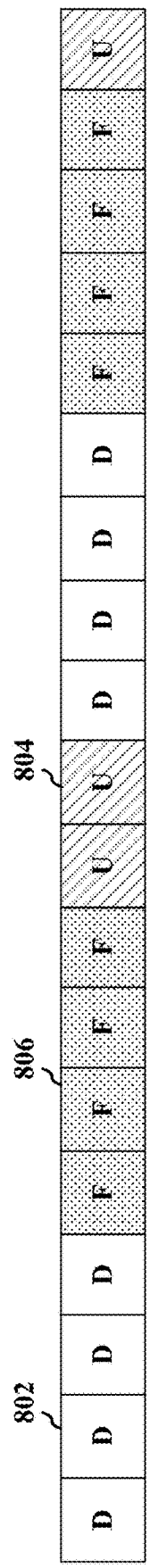
FIG. 8A
FIG. 8B
FIG. 8C

COVERAGE ENHANCEMENT FOR WIRELESS ENERGY TRANSFER

TECHNICAL FIELD

The present disclosure relates generally to communication systems, and more particularly, to wireless energy transfer.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a configuration for downlink resources in at least one of time or frequency; and transmit an energy transfer signal on one or more of the downlink resources.

In another aspect of the disclosure, a method, a computer-readable medium, and an apparatus are provided. The apparatus may obtain a report indicative of a capability of a user equipment (UE) to transmit an energy transfer signal on at least one of a downlink band of a frequency division duplex (FDD) configuration or at least one of a downlink symbol or a downlink slot of a time division duplex (TDD) configuration; and output at least one of the TDD configuration or the FDD configuration for the energy transfer signal, the TDD configuration including the at least one of the downlink symbol or the downlink slot, the FDD configuration including the downlink band.

In another aspect of the disclosure, a method, a computer-readable medium, and an apparatus are provided. The apparatus may configure uplink resources for uplink transmission by one or more UEs; and transmit an energy transfer signal on one or more of the uplink resources.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 illustrates diagrams indicative of a received power based on a separation distance.

FIGS. 8A and 8B illustrate examples of half-duplex communication, in accordance with various aspects of the present disclosure.

FIG. 8C illustrates a diagram of a time division duplex (TDD) slot configuration, in accordance with various aspects of the present disclosure.

DETAILED DESCRIPTION

Figure 1:
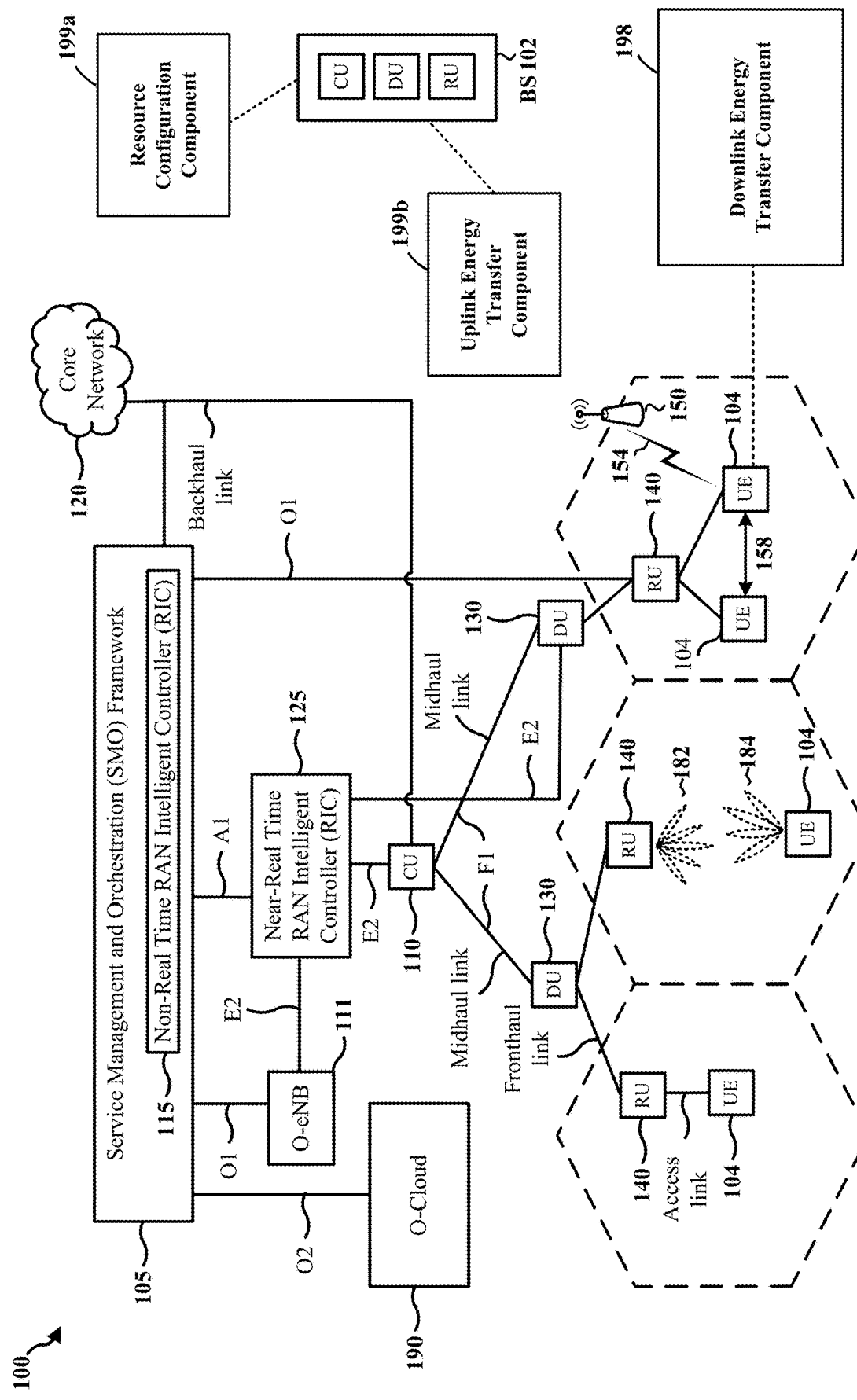
FIG. 1 is a diagram illustrating an example of a wireless communications system and an access network, in accordance with various aspects of the present disclosure.

A network entity may transmit energy signals and/or communication signals. Coverage for energy signals may be smaller than for communication signals. Aspects presented herein enable cooperative energy transfer signaling between a network entity and a UE to provide more continuous energy transfer transmissions to one or more devices.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a downlink energy transfer component 198 configured to receive a configuration for downlink resources in at least one of time or frequency; and transmit an energy transfer signal on one or more of the downlink resources. In certain aspects, the base station 102 or a network entity of the base station 102 may include a resource configuration component 199a configured to obtain a report indicative of a capability of a UE to transmit an energy transfer signal on at least one of a downlink band of a frequency division duplex (FDD) configuration or at least one of a downlink symbol or a downlink slot of a time division duplex (TDD) configuration; and output at least one of the TDD configuration or the FDD configuration for the energy transfer signal, the TDD configuration including the at least one of the downlink symbol or the downlink slot, the FDD configuration including the downlink band. In certain aspects, the base station 102 or a network entity of the base station 102 may include an uplink energy transfer component 199b configured to configure uplink resources for uplink transmission by one or more UEs; and transmit an energy transfer signal on one or more of the uplink resources. Although the following description may be focused on 5G NR, the concepts described herein may be applicable to other similar areas, such as LTE, LTE-A, CDMA, GSM, and other wireless technologies.

Figure 2:
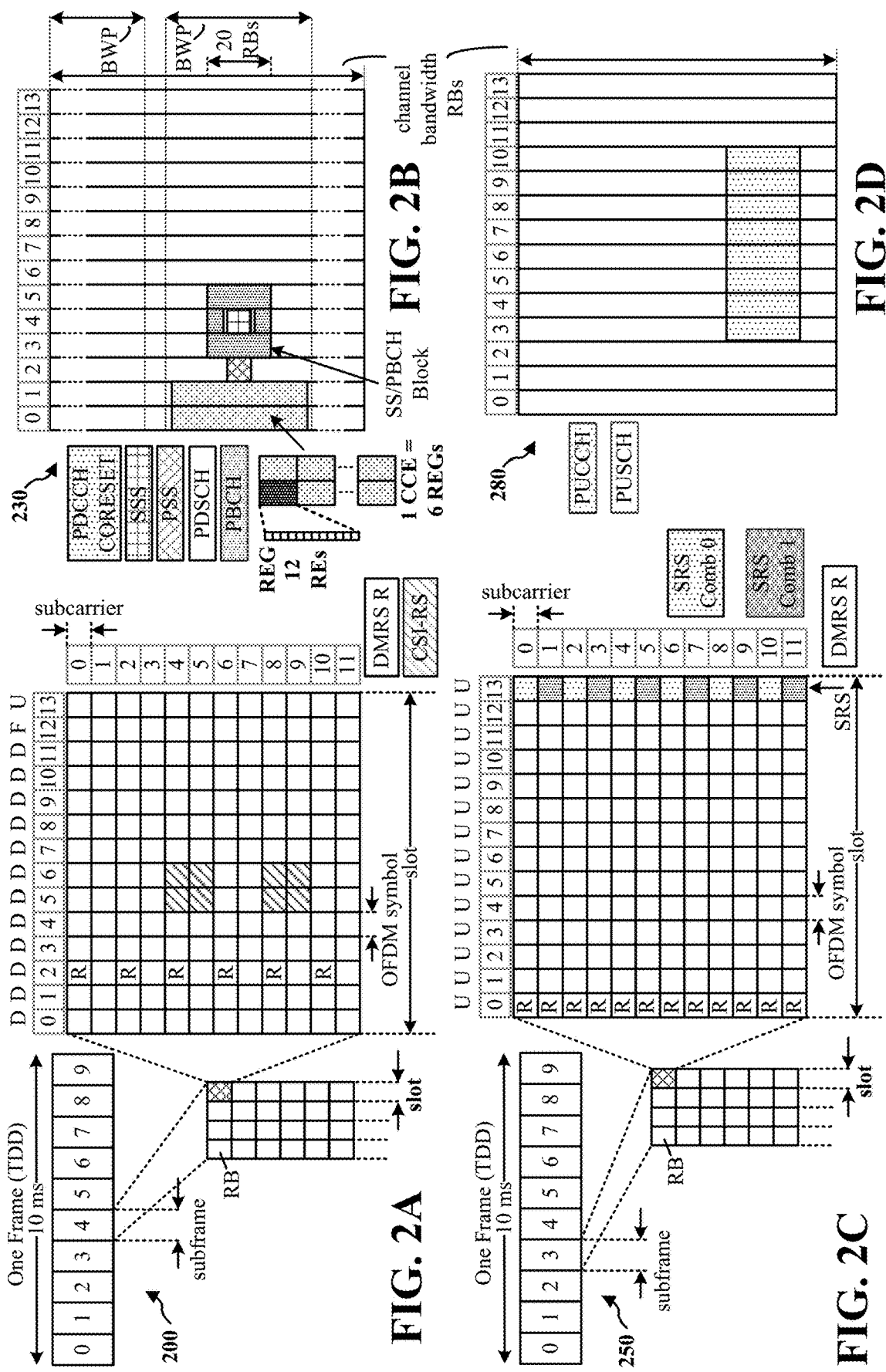
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, |

| μ | SCS<br>Δf =<br>$2^\mu \cdot 15$[kHz] | Cyclic<br>prefix |
|---|---|---|
| 3 | 120 | Extended<br>Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
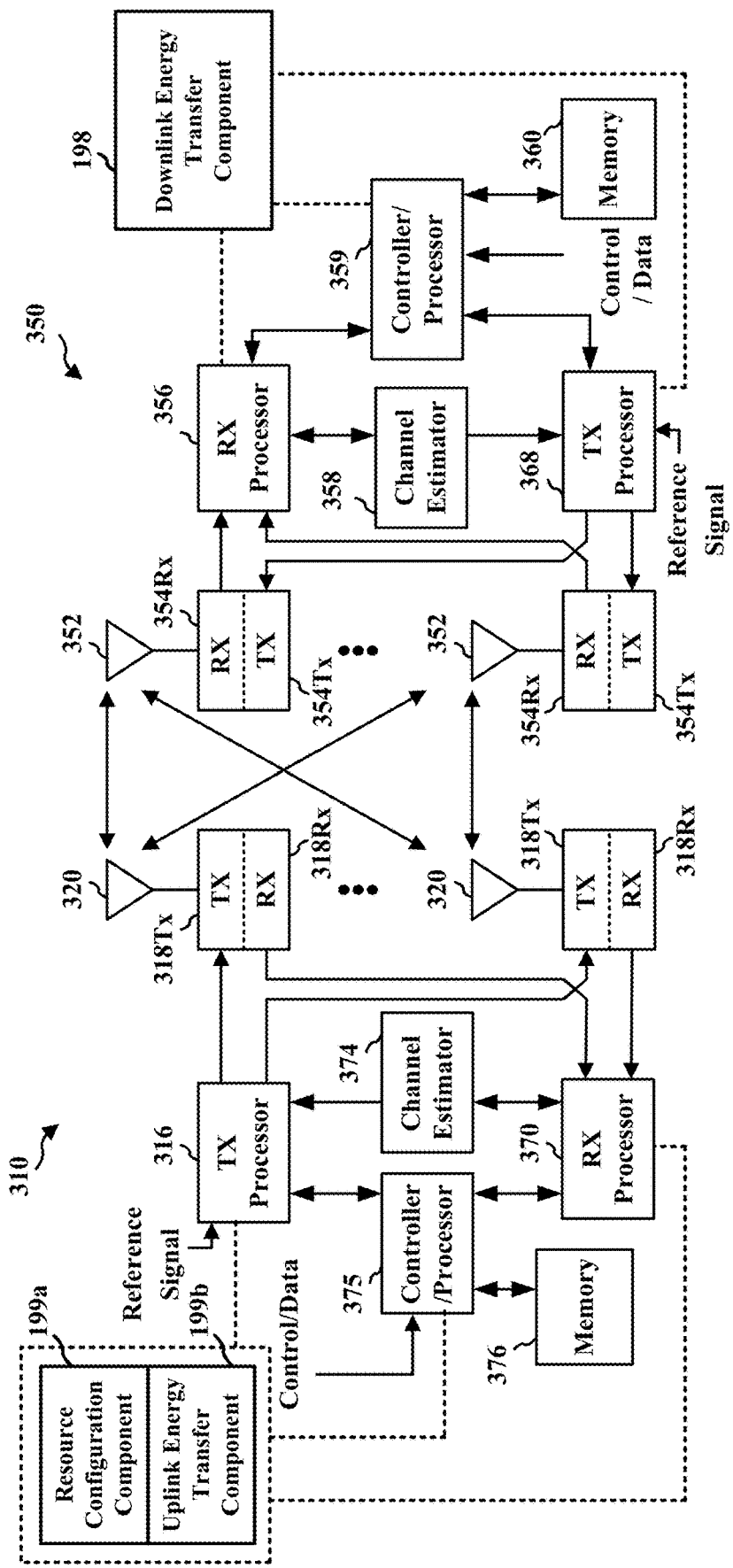
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the downlink energy transfer component 198 of FIG. 1.

At least one of the TX processor 316, the RX processor 370, and the controller/processor 375 may be configured to perform aspects in connection with the resource configuration component 199*a* of FIG. 1.

At least one of the TX processor 316, the RX processor 370, and the controller/processor 375 may be configured to perform aspects in connection with the uplink energy transfer component 199*b* of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
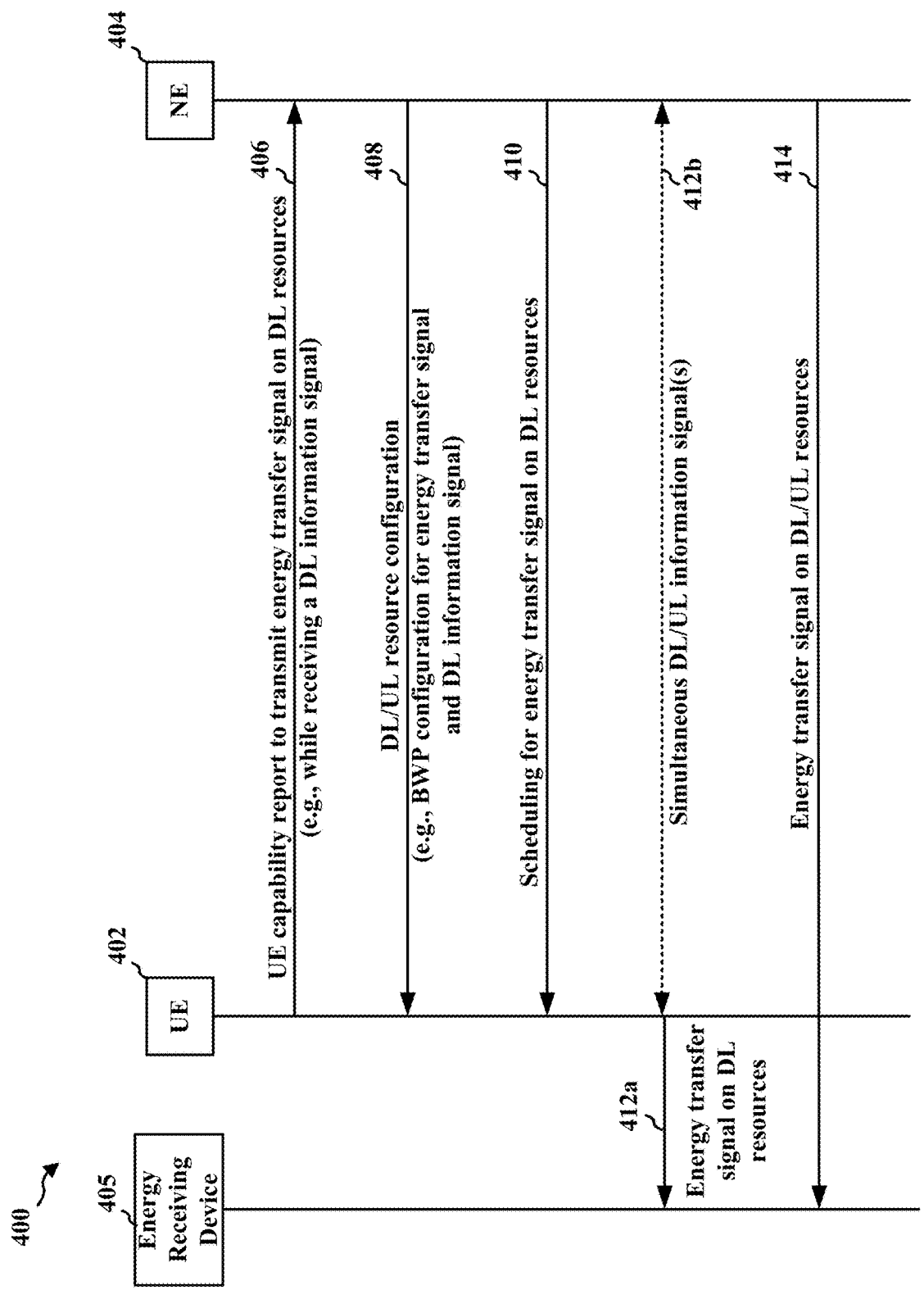
FIG. 4 is a call flow diagram illustrating communications between a UE and a network entity, in accordance with various aspects of the present disclosure.

FIG. 4 is a call flow diagram 400 illustrating wireless communications between a UE 402 and a network entity 404 and wireless energy transfer signals with an energy receiving device 405 according to aspects presented herein. The network entity 404 may correspond to a base station or an entity at a base station, such as a CU, a DU, an RU, etc. The network entity may be configured to provide an energy transfer signal that enables a receiving device to harvest energy from an over-the-air signal. As an example, the network entity 404 (e.g., base station) may be configured to participate in radio frequency identification (RFID) communications. For example, the network entity 404 may transmit an energy transfer signal to an RFID tag, or cause another device, such as the UE 402, to transmit an energy transfer signal to the RFID tag either simultaneously with, or independent of, the network entity 404. "Energy transfer signal" refers to a dedicated signal for transferring energy from a first device to a second device, where the dedicated signal may be independent of information transfer signals transmitted between the first device and the second device.

In some aspects, at 406, the UE 402 may transmit a UE capability report to the network entity 404. The UE capability report may be indicative of a UE capability to transmit an energy transfer signal on downlink resources. In examples, the UE capability report may be indicative of a UE capability to transmit the energy transfer signal on the downlink resources while receiving a downlink information signal from the network entity 404.

At 408, the network entity 404 may transmit a downlink resource configuration and/or an uplink resource configuration to the UE 402. For example, the downlink resource configuration may correspond to at least one of a TDD configuration including one or more downlink symbols/slots for transmitting the energy transfer signal or an FDD configuration including a downlink band for transmitting the energy transfer signal. The downlink resource configuration transmitted, at 408, by the network entity 404 may include configuring a first BWP for the energy transfer signal and a second BWP for the downlink information signal. Further, the uplink resource configuration may correspond to at least one of a TDD configuration including one or more uplink symbols/slots for transmitting the energy transfer signal or an FDD configuration including an uplink band for transmitting the energy transfer signal.

At 410, the network entity 404 may schedule the energy transfer signal on downlink resources (e.g., based on the downlink resource configuration transmitted, at 408, to the UE 402). At 412a, the UE 402 may transmit the energy transfer signal on the downlink resources, e.g., which may be received by the energy receiving device 405. The energy transfer signal may be communicated, at 412a, independent of, or simultaneously with, one or more other signals. For example, the UE 402 may receive, at 412b, a downlink information signal from the network entity 404 simultaneously with transmitting the energy transfer signal, at 412a, on the downlink resources. In further example, the UE 402 may transmit, at 412b, an uplink information signal to the network entity 404 simultaneously with (e.g., overlapping at least partially in time with) transmitting, at 412b, the energy transfer signal on the downlink resources.

At 414, the network entity may transmit a second energy transfer signal on downlink resources or uplink resources, e.g., which may be received by the energy receiving device 405. The second energy transfer signal may be transmitted, at 414, concurrently with the energy transfer signal transmitted, at 412a, by the UE 402. For example, the energy transfer signal of the UE 402 transmitted, at 412a, on the downlink resources may be used to assist/strengthen an energy transfer procedure associated with a downlink energy transfer signal of the network entity 404 (e.g., transmitted at 414). In further examples, the network entity 404 may be configured to transmit the energy transfer signal on uplink resources.

Figure 5:
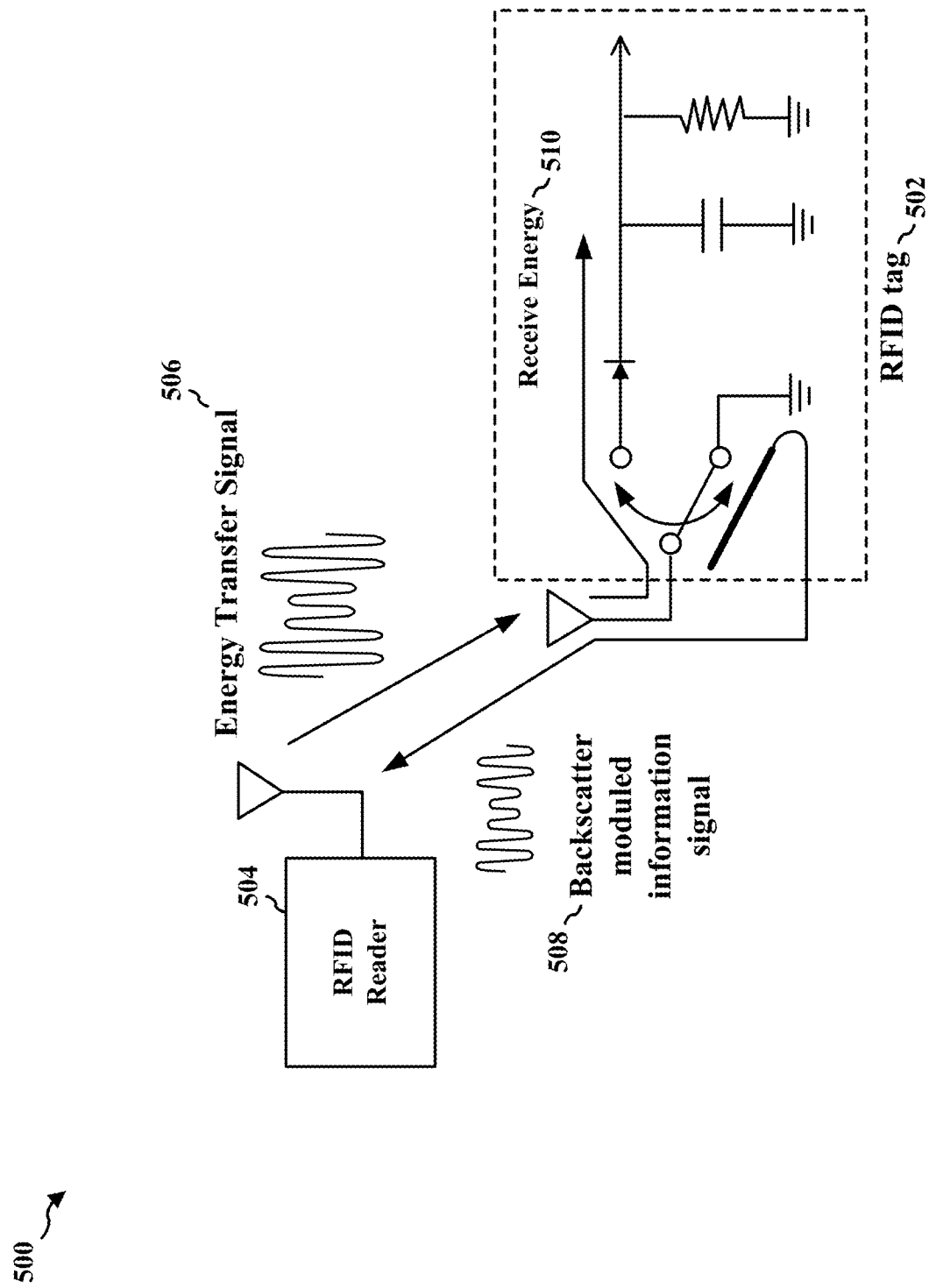
FIG. 5 illustrates a diagram of a radio frequency identification (RFID) tag that receives an energy transfer signal from an RFID reader, in accordance with various aspects of the present disclosure.

FIG. 5 illustrates a diagram 500 of an RFID tag 502 that receives an energy transfer signal 506 from an RFID reader 504. Such an RFID tag 502 is one example of a receiving device 405 that may obtain energy from an energy transfer signal. A wireless energy transfer signal 506 may be used for various industrial IoT (IIoT) applications. For example, RFID technology may be used for inventory/asset management both inside and outside of warehouses, network sensors in factories, agricultural applications, smart homes, etc. RFID technology may also be deployed in association with cellular infrastructure for wireless applications. RFID devices may include a transponder (e.g., the RFID tag 502) that emits an information-bearing signal, such as a backscattered modulated information signal 508, upon receiving a signal from the RFID reader 504. That is, the RFID reader 504 may transmit the energy transfer signal 506 as well as an information signal to a passive RFID microchip (e.g., RFID tag 502) that operates without a battery source.

The RFID tag 502 may be configured to operate without the battery source at a low operational expenditure (OPEX), low maintenance cost, and/or increased lifecycle. Other types of RFID tags may include battery sources. For example, semi-passive RFID devices and active RFID devices may have a battery source, but may also be associated with a higher cost. If the RFID reader 504 is able to provide enough received energy 510 to the RFID tag 502, the RFID tag 502 may harvest the received energy 510 to perform an operation during communication occasions or may harvest the received energy 510 to charge an associated battery. Passive RFID tags may harvest the received energy 510 over-the-air in order to power Tx/Rx circuitry at the RFID tag 502. The energy transfer signal 506 transmitted to the RFID tag 502 may trigger the backscattered modulated information signal 508 from the RFID tag 502. The RFID tag 502 may absorb or reflect signals from the RFID reader 504 based on the information to be communicated between the RFID tag 502 and the RFID reader 504. The RFID tag 502 may include a decreased number of active RF components (e.g., no active RF component) in some cases. By increasing a coverage area of the energy transfer signal 506, the RFID reader 504 and the RFID tag 502 may communicate at longer physical distances.

Wireless communication techniques associated with eMBB, URLLC, machine-type communication (MTC), etc., may be supported for passive IoT devices. Passive IoT devices are another example of an energy receiving device, such as 405 in FIG. 4. In examples, the RFID reader 504 may correspond to a base station or an entity at a base station, and the RFID tag 502 may correspond to a UE or be in communication with the UE. However, some wireless communication techniques may not support certain types of widespread RFID technology, such as passive IoT devices used for asset management, logistics, warehousing, and manufacturing, etc. Among other examples, passive IoT devices may include timing devices such as clocks, video devices, household tools, construction tools, lighting systems, etc.

Coverage enhancements for wireless energy transfer may be used to incorporate passive IoT devices into wireless networks. Using a cellular infrastructure, a base station/network entity may operate as the RFID reader 504 that transmits the energy transfer signal 506 to the RFID tag 502 for communicating with the passive IoT devices via RFID technology. The base station/network entity may provide energy to the passive IoT devices via the energy transfer signal 506 (e.g., which may correspond to 412a or 414) and may be configured to read/write information stored at the passive IoT devices. Information-bearing signals may be reflected from the passive IoT devices to the base station/network entity, which may read the reflected signal. For instance, the base station/network entity may decode information included in the information-bearing signals (e.g., backscattered modulated information signal 508) received from the passive IoT devices (e.g., RFID tag 502).

Figure 6:
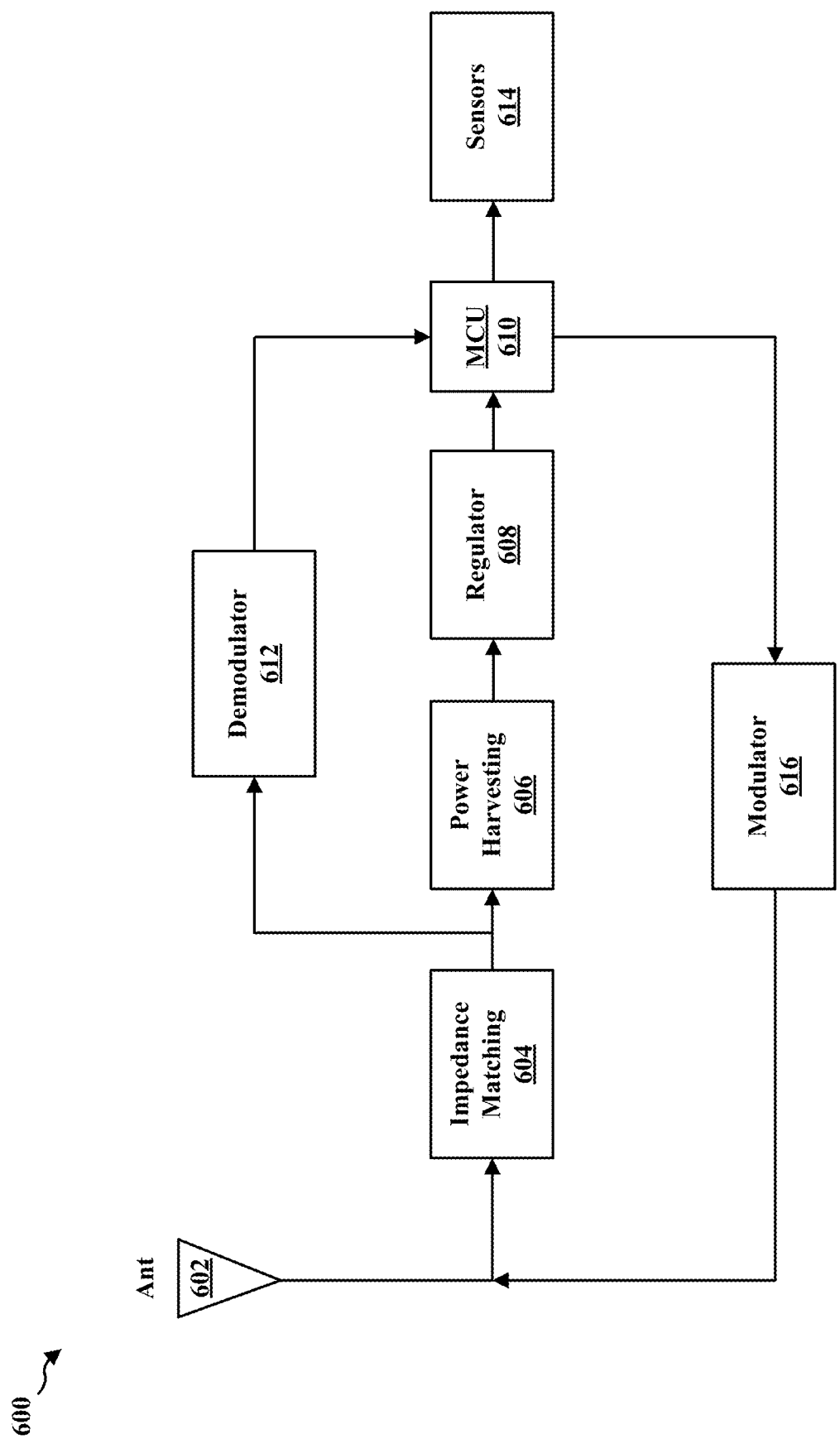
FIG. 6 is a diagram of a power harvesting circuit, in accordance with various aspects of the present disclosure.

FIG. 6 is a diagram 600 of a power harvesting circuit. In examples, the power harvesting circuit may be included at an RFID tag and may include few or no active components. The power harvesting circuit may be configured to operate at low power during an energy transfer procedure for RF power harvesting. The energy transfer signal may be received by an antenna 602 and communicated to an impedance matching component 604. The impedance matching component 604 may be tuned to an impedance of the antenna 602, so that an input to a power harvesting component 606 may be based on an increased power from the impedance matching component. An output of the impedance matching component 604 may also be demodulated by a demodulator 612 and provided to a microcontroller unit (MCU).

A non-linearity of the power harvesting component 606 may be generated at an output of the power harvesting component 606 based on characteristics of a diode associated with the power harvesting component 606. For instance, the power harvesting component 606 may include a diode that has to receive a minimum voltage/power from the antenna 602 and impedance matching component 604 in order to activate the diode. The minimum voltage/power that is input to the power harvesting component 606 to activate the diode may be larger than a power associated with an information signal. For example, the input power to the power harvesting component 606 may be larger than −20 dBm, although −10 dBM may be a minimum power to activate the diode/power harvesting component 606 in some cases. The power harvesting component 606 may be more efficient at lower frequencies at converting the energy transfer signal to power based on a capacitance and/or a resistance of the diode at the power harvesting component 606. In contrast to energy transfer signals, bits of an information signal may be decoded at power inputs as low as −100 dBm to −80 dBm.

A regulator 608 may receive an output of the power harvesting component 606. The regulator 608 may regulate the non-linearity of the power harvesting component 606 prior to providing the output of the power harvesting component 606 to the MCU 610. The MCU 610 may be configured to control sensors 614 in communication with the MCU 610 based on the harvested power and/or output a signal to a modulator 616 that modulates the output signal as feedback for antenna 602 and/or the impedance matching component 604.

FIG. 7 illustrates diagrams 700-750 indicative of a received power based on a separation distance. For instance, the diagram 700 illustrates a received power of a radio frequency integrated circuit (RFIC) indicated via Pt(dBm) based on a separation distance r(m) of associated devices. RFID devices may be supported at short ranges (e.g., 0-10 m for passive IoT devices) based on RF link budgets.

The diagram 700 is indicative of a link budget analysis that illustrates whether an RFIC threshold input power is satisfied for an RFID tag. As the separation distance between the RFID devices increases, a corresponding RFIC received power may decrease. Separation distances illustrated in the link budget analysis of the diagram 700 may range from 1-10 m, where the network entity/base station 704 may be providing an energy transfer signal to the RFID tag. A first aspect of the link budget analysis may be indicative of a Friis link budget, which may be associated with a transmission equation that indicates the RF link budget of the RFID devices. A second aspect of the link budget analysis may be indicative of the RFIC received power on a cardboard surface with a multipath channel. A third aspect of the link budget analysis may be indicative of the RFIC received power on an aluminum surface with a multipath channel.

The separation distance for a power link, such as a downlink energy transfer signal from an RFID reader to an RFID tag, may bottleneck energy transfer operations. The power harvesting component may have to receive a high input power (e.g., −13 dBm) for activation of the diode/RFID tag. A larger separation distance between the RFID reader and the RFID tab may cause a lower received power at the RFID tag. A low input power, such as −20 dBm or lower, may not provide a threshold cost and conversion efficiency between the RFID devices. For example, the cost and conversion efficiency may be less than 1 percent at input powers lower than −20 dBm. Reflections of the energy transfer signal in the multi-path channel may also cause a reduction/fading to the energy transfer signal that may decrease a range of the energy transfer signal.

A base station 704 may transmit both energy transfer signals and communication/information signals to an Rx device, such as an energy receiver 710, at a predefined power level. Power harvesting procedures performed based on the energy transfer signal may be associated with a high input power (e.g., −20 dBm to −10 dBm) at the energy receiver 710. Communication signals associated with information transfer between the base station 704 and a UE 702 may be decoded at much lower input powers (e.g., −70 dBm to −100 dBm). Thus, a first coverage area 708a associated with the energy transfer signal may be much smaller than a second coverage area 708b associated with communication/information signals transmitted to the UE 702.

The second coverage area 708b for information decoding may range from hundreds of meters to kilometers based on a transmit power and a waveform of the information signal. However, due to the higher input power for energy transfer signals, the first coverage area 708a of the energy transfer signal may be less than 10 m. Thus, the UE 702 may also be configured to transmit energy transfer signals to the energy receiver 710, such as a passive RFID tag, to assist the base station 704 with energy transfer operations and increase the first coverage area 708a of the base station 704.

Cellular slot structures may be based on TDD and FDD configurations. In TDD configurations, the UE 702 may only transmit on uplink symbols and slots. Thus, transmitters at the UE 702 may be switched off for downlink symbols and slots, where the UE 702 may be receiving communication from the base station 704. In FDD, the UE 702 may have a dedicated band for uplink transmissions. FIG. 8A illustrates a time division duplex scheme (TDD) 825 in which a wireless communications device (e.g., the base station 102 or UE 104) receive and transmit signals, such as received signal 822 (or Rx) and transmitted signal 824 (Tx), at different times (but may allow these signals to be received/transmitted on a same frequency bandwidth). The duplex scheme 825 also illustrates a guard time 826 that may help to avoid interference in the transmission/reception. FIG. 8B illustrates a frequency division duplex scheme (FDD) 850 in which a wireless communications device (e.g., the base station 102 or UE 104) may receive and transmit signals, such as received signal 812 and transmitted signal 814, on different frequencies (but may allow these signals to be received/transmitted at overlapping times). The duplex scheme 850 illustrates a guard band 816 that spaces the frequency of the reception and transmission and may help to avoid interference. The duplex schemes 825 and 850 are considered half duplex communication (or schemes) as they include a division in time and/or frequency between UL and DL signals.

For energy transfer procedures, a performance associated with the energy transfer signal may be increased based on continuous energy transfer/charging at the energy receiver 710 (e.g., RFID tag) over time. Accordingly, the UE 702 may be configured to transmit an energy transfer signal on downlink symbols and slots in TDD configurations and/or downlink bands in FDD configurations for energy transfer procedures. Such techniques may allow for a continuous transfer of energy to an energy receiving device without a disruption in received energy transfer signaling at the energy receiver 710. The base station 704 and the UE 702 may also cooperate in some aspects to increase the coverage areas 708a-708b for wireless energy transfer procedures.

FIG. 8C illustrates a diagram 800 of a TDD slot configuration. Passive IoT devices may operate based on a TDD band/TDD slot configuration, such that wireless energy transfer may be performed based on the TDD band/TDD slot configuration. An energy transfer signal may be transmitted simultaneously with information signals for wireless communication. A TDD configuration may be indicated by the base station as including one or more downlink symbols/slots 802, one or more uplink symbols/slots 804, and/or one or more flexible symbols/slots 806. That is, the TDD configuration may include symbols/slots determined by the base station to be dedicated to either downlink transmissions or uplink transmissions.

Downlink transmissions of the TDD configuration may correspond to PDCCH/PDSCH transmissions of the base station. Uplink transmissions of the TDD configuration may correspond to PUCCH/PUSCH transmissions of the UE. The flexible symbols/slots 806 may be scheduled by the base station in a dynamic manner to be used for either the downlink transmissions or the uplink transmissions. For example, if the base station provides an indication that one or more of the flexible symbols/slots 806 are to be used for downlink communication, the UE may not be permitted to transmit on uplink during the one or more flexible symbols/slots 806. Aspects presented herein enable the UE to use symbols/slots (e.g., in a continuous manner) to improve energy transfer/charging procedures.

Accordingly, for wireless energy transfer procedures associated with a TDD configuration, the UE may transmit one or more energy transfer signals in the downlink symbols/slots 802. The UE may be scheduled by the base station for energy transfer in the downlink symbols/slots 802 in semi-static or dynamic manner. For example, the base station may determine (e.g., based on feedback) that one or more passive IoT devices are in a coverage area of a particular UE. Thus, the base station may indicate to the particular UE that the particular UE may perform an energy transfer procedure.

Similarly, the base station may determine to transmit energy transfer signals in the uplink symbols/slots 804, which may provide a more continuous supply of energy transfer signals together with the UE's transmission in the downlink resources. The base station and the UE may cooperate based on such techniques to provide the energy transfer to the IoT device. For instance, the base station and the UE may transmit energy transfer signals toward the passive IoT device simultaneously, so that the passive IoT device may receive an increased amount of energy at an input of the passive IoT device.

Referring again to the diagram 750, the base station 704 may transmit the energy transfer signal to the energy receiver 710, but the energy transfer signal may be too weak individually to activate the energy receiver 710. Thus, the UE 702 may assist the base station 704 by also transmitting an energy transfer signal to the energy receiver 710, regardless of the TDD configuration (e.g., regardless of whether the UE 702 is transmitting the energy transfer signal on the downlink symbols/slots 802 or the uplink symbols/slots 804). That is, for wireless energy transfer procedures associated with a TDD configuration, the UE 702 may transmit the energy transfer signal in the downlink symbols/slots 802, which may maintain continuous energy transfer to the energy receiver 710.

The UE 702 may report a UE capability to the base station 704 for performing energy transfer procedures. For example, the UE 702 may report a UE capability to transmit in the downlink symbols/slots 802 that may otherwise be used for the UE 702 to listen for downlink traffic from the base station 704, where the UE 702 would not normally be able to transmit. The UE capability for transmitting energy may be used by the base station 704 to schedule the UE 702 for one or more energy transfer signals. The UE report of the UE capability to transmit the energy transfer signal on the downlink symbols/slots 802 may be indicative of further UE capabilities, such as full-duplex/half-duplex communications, beamforming capabilities, a number of antennas that may be used for the wireless energy transfer procedure, a transmit power, a maximum deliverable energy, a maximum energy transfer duration, etc. For instance, the UE 702 may determine to report a maximum deliverable energy based on a battery state of the UE 702, the UE 702 may request to cool down after a certain amount of energy transfer, etc.

Figure 17:
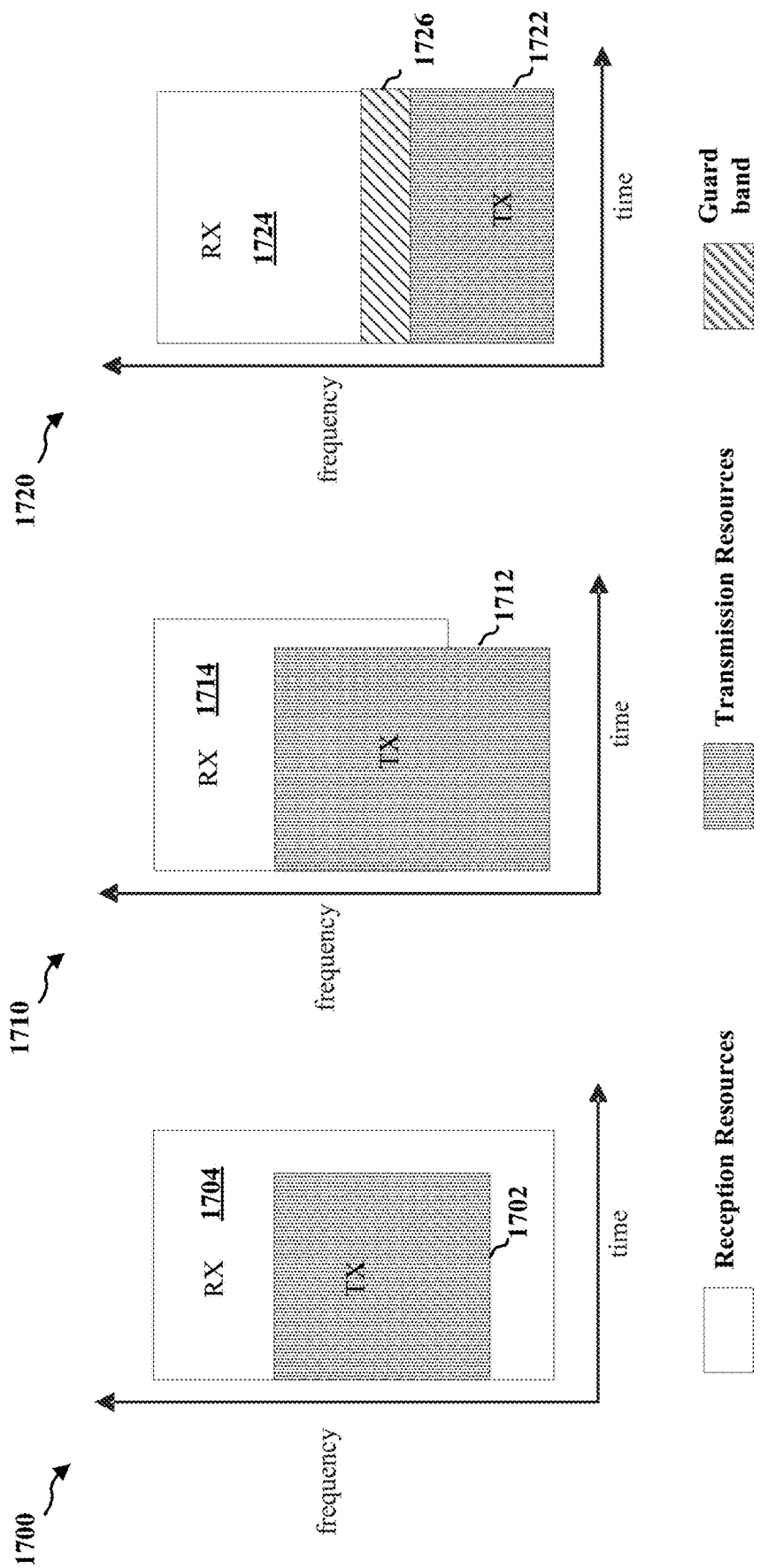
FIG. 17 illustrates examples of in-band full-duplex (IBFD) resources and sub-band frequency division duplex (FDD) resources for full-duplex communication.

Full-duplex communication may be in a same frequency band. The uplink and downlink communication may be in different frequency subbands, in the same frequency subband, or in partially overlapping frequency subbands. FIG. 17 illustrates a first example 1700 and a second example 1710 of in-band full-duplex (IBFD) resources and a third example 1720 of sub-band full-duplex resources. In IBFD, signals may be transmitted and received in overlapping times and overlapping in frequency. As shown in the first example 1700, a time and a frequency allocation of transmission resources 1702 may fully overlap with a time and a frequency allocation of reception resources 1704. In the second example 1710, a time and a frequency allocation of transmission resources 1712 may partially overlap with a time and a frequency of allocation of reception resources 1714.

IBFD is in contrast to sub-band FDD, where transmission and reception resources may overlap in time using different frequencies, as shown in the third example 1720. In the third example 1720, the transmission resources 1722 are separated from the reception resources 1724 by a guard band 1726. The guard band may be frequency resources, or a gap in frequency resources, provided between the transmission resources 1722 and the reception resources 1724. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 1702, 1712, and 1722 may correspond to uplink resources, and the reception resources 1704, 1714, and 1724 may correspond to downlink resources. The UE capability may be associated with a plurality of categories. A UE capability category (Cat) 0 indication may indicate that the UE 702 does not support energy transfer in the downlink symbols/slots 802. Thus, the UE 702 may be listening for signaling from the base station 704 in the downlink symbols/slots 802. In some examples, the UE 702 may be a low-power device that may only support energy transfer in the uplink symbols/slots 804 and the flexible symbols/slots 806. Energy transfer in the flexible symbols/slots 806 may be based on scheduling by the base station 704 and/or a protocol of the UE 702.

A UE capability Cat 1 indication may indicate that the UE 702 supports half-duplex communication. That is, the UE 702 may, at a single time instance, either transmit an energy transfer signal and/or transmit uplink information, or receive downlink traffic, such as data, control signaling, and/or measure a downlink reference signal. The UE 702 may not be able to perform a downlink reception and transmit an energy transfer signal at a same time based on a half-duplex configuration. The UE capability Cat 1 may indicate that no energy transmission of the UE 702 may overlap with a downlink reception from the base station 704, such as reception of a PDCCH, PDSCH, CSI-RS, SSB, measurement gap for measuring a neighboring cell reference signal during a handover procedure, etc.

Figure 9:
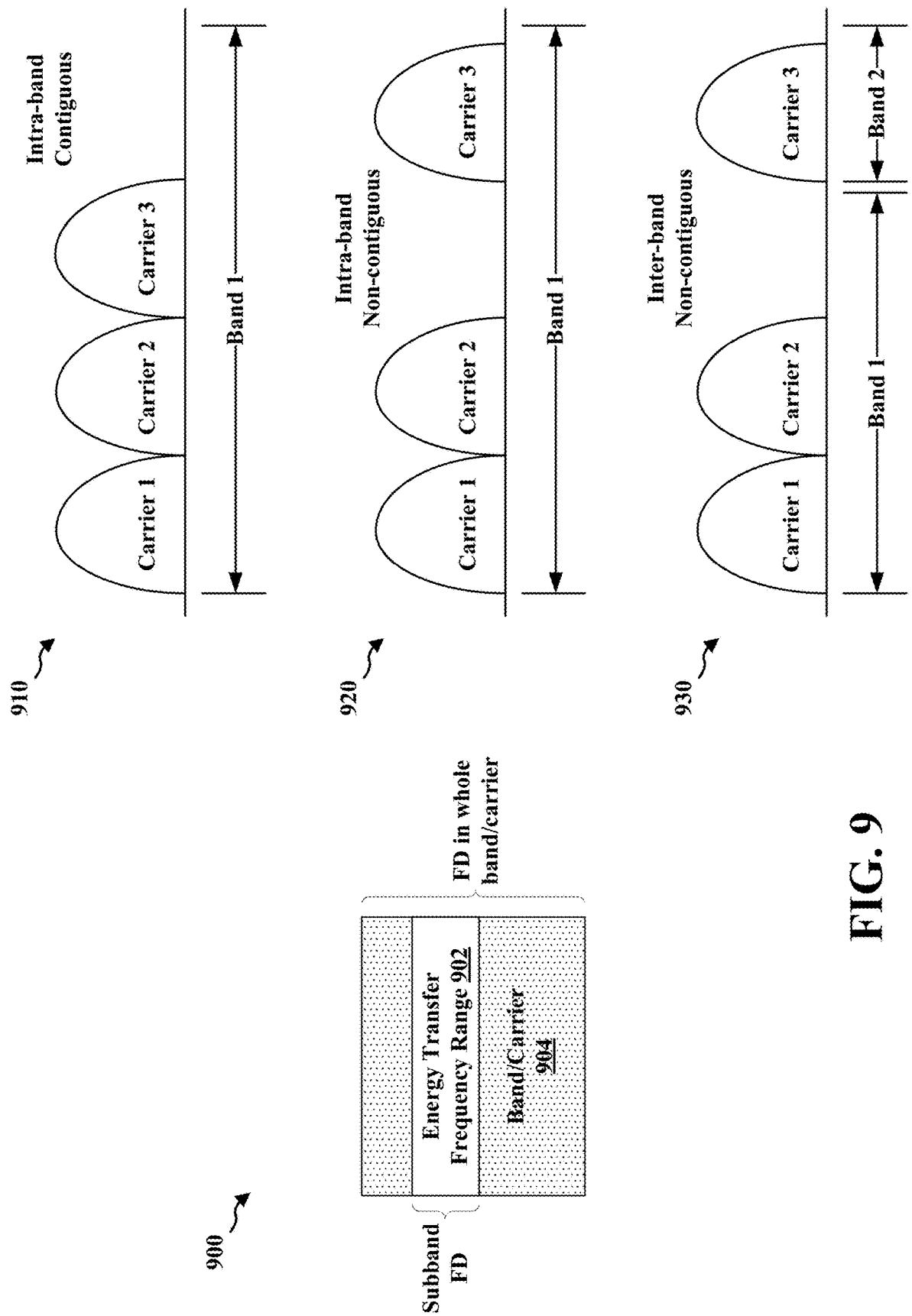
FIG. 9 illustrates carrier diagrams associated with wireless energy transfer, in accordance with various aspects of the present disclosure.

FIG. 9 illustrates carrier diagrams 900, 910, 920, and 930 associated with wireless energy transfer. The UE may indicate a UE capability for full-duplex communication, sub-band full-duplex communication, etc. For instance, the UE may indicate that the UE is capable of simultaneously receiving downlink traffic and transmitting an energy transfer signal.

A UE capability Cat 2 indication may indicate that the UE supports full-duplex communication within a subband. The subband may correspond to an energy transfer frequency range 902 within a portion of a band/carrier 904. Simultaneous energy transfer and downlink reception within a predefined subband (e.g., energy transfer frequency range 902) and/or predefined slots/symbols may be performed by the UE based on the UE capability. For example, at a first time instance the UE may be scheduled for full-duplex communication and at a second time instance the UE may be scheduled for half-duplex communication. The predefined subband may be signaled between the base station and the UE to determine a time instance/subband that the UE may perform the full-duplex communication.

The energy transfer frequency range 902 may be continuous or discontinuous within the band/carrier 904. For example, a first BWP may be utilized for downlink reception within the band/carrier 904 and a second BWP associated with the energy transfer frequency range 902 may be utilized for wireless energy transfer within the same band/carrier 904, but may not be continuous. The UE may not simultaneously receive downlink signaling and transmit an energy transfer signal outside the signaled subband. For example, the energy transfer signal may not be transmitted within the energy transfer frequency range 902 simultaneously with a downlink reception that is outside the subband. If the UE is transmitting the energy transfer signal while the base station is transmitting a downlink signal outside the subband, the UE may not be able to hear/receive the message that is transmitted by the base station outside the subband.

A UE capability Cat 3 may be a highest capability of the UE. For example, a UE capability Cat 3 indication may indicate that the UE may perform a full-duplex communication within an entirety of the band/carrier 904. The UE may receive downlink signaling from the base station and transmit one or more energy transfer signals simultaneously within the band/carrier 904. The downlink signaling and the energy transfer signals may be configured in different BWPs within the band/carrier 904. That is, the UE may configure a downlink BWP and an energy transfer BWP within the band/carrier 904. The UE may signal to the base station whether the UE supports the UE capability Cat 3 on a per band/carrier basis.

While UE capability Cats 0-3 may be based on a single carrier, UE capability Cat 4 may correspond to carrier aggregation (CA). A UE capability Cat 4 indication may indicate that the UE may perform full-duplex communication for different band/carrier combinations. For example, UE capability Cat 4 may be based on the carrier diagram 910 indicative of intra-band contiguous CA, the carrier diagram 920 indicative of intra-band non-contiguous CA, or the carrier diagram 930 indicative of inter-band non-contiguous CA. Intra-band contiguous CA corresponds to a band where each of the carriers of the band have no frequency gaps between any of the carriers, as illustrated in the carrier diagram 910. Intra-band non-contiguous CA corresponds to a band where one or more of the carriers of the band have a frequency gap between the one or more carriers, as illustrated in the carrier diagram 920. Inter-band non-contiguous CA corresponds to a first band of one or more first carriers and a second band of one or more second carriers, where a frequency gap is included between the one or more first carriers of the first band and the one or more second carriers of the second band, as illustrated in the carrier diagram 930.

Energy transfer signals may be configured in a first carrier, while downlink information may be configured in a second carrier. For instance, in the carrier diagram 910, carrier 1 and carrier 2 may be configured for downlink traffic and carrier 3 may include a bandwidth configured for energy transfer. The UE may simultaneously support energy transfer in one or more first bands/carriers and reception of downlink traffic in one or more second bands/carriers. Alternatively, the UE may support full-duplex communication in each of the carriers/bands (e.g., both reception of downlink traffic and transmission of energy transfer signals may be configured for each carrier/band).

Passive IoT devices may also operate based on wireless energy transfer procedures performed via an FDD band of an FDD configuration. For instance, the UE may perform a wireless energy transfer procedure based on transmission of an energy transfer signal in a downlink band of the FDD configuration. The UE may transmit a UE capability report to the base station to indicate whether the UE is capable of transferring energy while receiving downlink traffic. The UE may signal the UE capability of receiving downlink traffic while transmitting an energy transfer signal in a same band/carrier/BWP.

The UE may also signal a UE capability of simultaneously transmitting uplink information in an uplink band while transmitting the energy transfer signal in a downlink band. If the UE is not capable of simultaneously transmitting uplink information and an energy transfer signal, the UE may not schedule an uplink transmission that overlaps with an energy transfer signal. In further examples, the base station may be configured to transmit traffic on an uplink band or an uplink symbol/slot based on similar techniques as used by the UE to transmit downlink traffic on a downlink band or a downlink symbol/slot.

Figure 10:
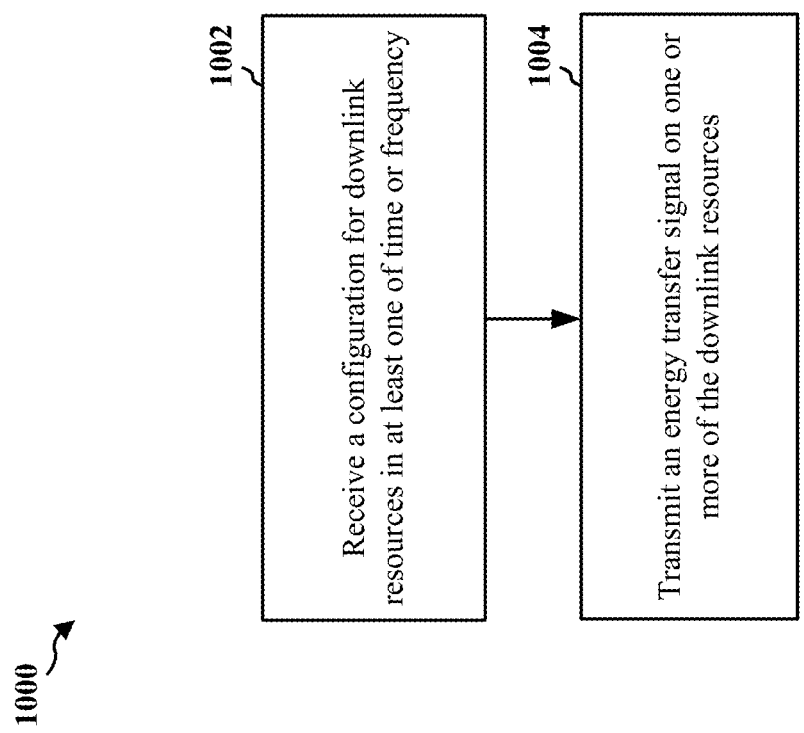
FIG. 10 is a flowchart of a method of wireless communication at a UE, in accordance with various aspects of the present disclosure.

FIG. 10 is a flowchart 1000 of a method of wireless communication. The method may be performed by a UE (e.g., the UE 104, 350, 402, 702, the apparatus 1504, etc.), which may include the memory 360 and which may correspond to the entire UE 104, 350, 402, 702 or apparatus 1504, or a component of the UE 104, 350, 402, 702 or the apparatus 1504, such as the TX processor 368, the RX processor 356, the controller/processor 359, the cellular baseband processor 1524, and/or the application processor 1506. The method may be performed to enhance wireless energy transfer between devices.

At 1002, the UE may receive a configuration for downlink resources in at least one of time or frequency. For example, referring to FIG. 4, the UE 402 may receive, at 408, a downlink/uplink resource configuration from the network entity 404. The reception, at 1002, may be performed by the downlink energy transfer component 198 of the apparatus 1504 in FIG. 15.

At 1004, the UE may transmit an energy transfer signal on one or more of the downlink resources. For example, referring to FIG. 4, the UE 402 may transmit, at 412a, the energy transfer signal to the network entity 404 on the downlink resources. The transmission, at 1004, may be performed by the downlink energy transfer component 198 of the apparatus 1504 in FIG. 15.

Figure 11:
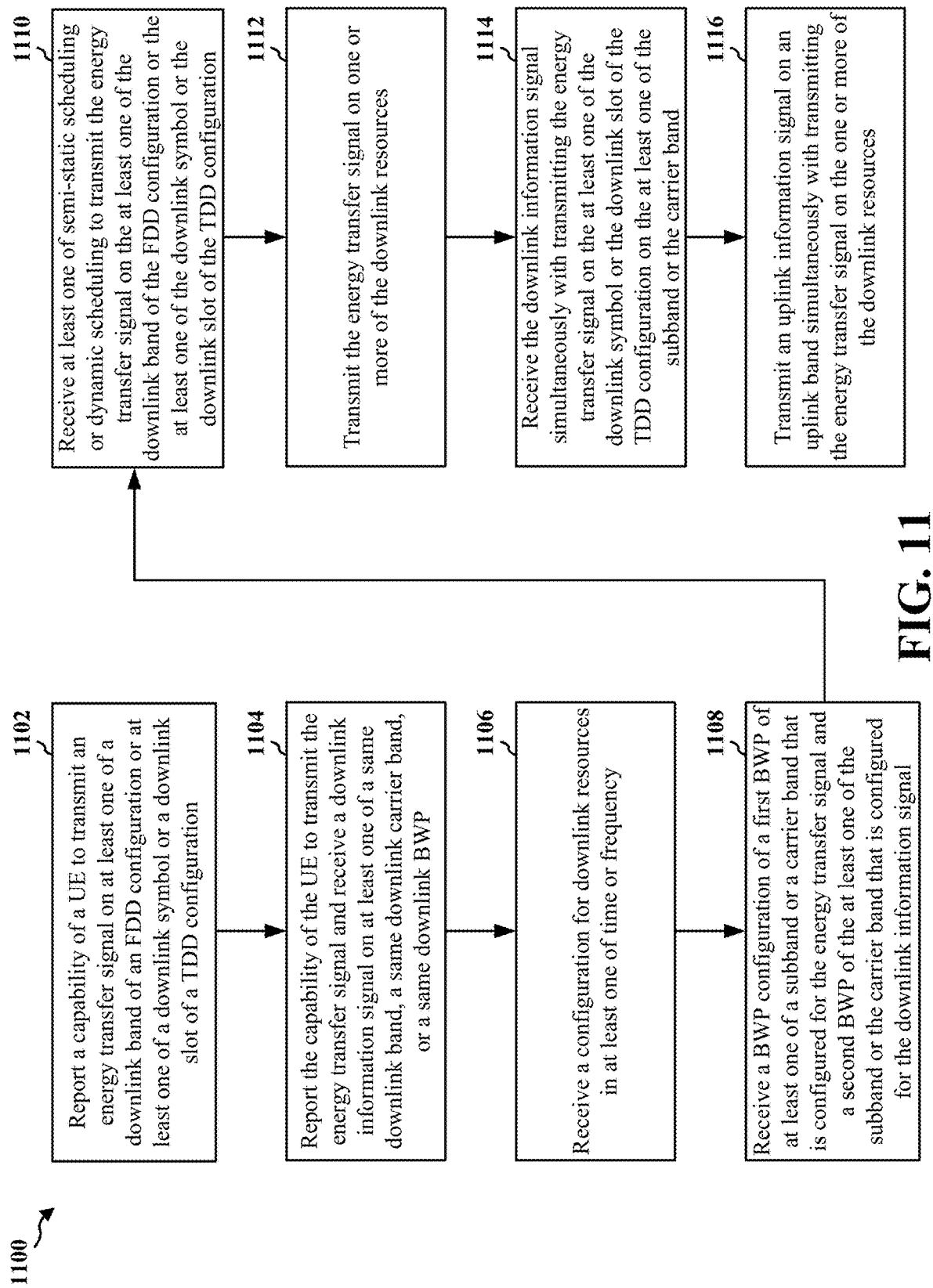
FIG. 11 is a flowchart of a method of wireless communication at a UE, in accordance with various aspects of the present disclosure.

FIG. 11 is a flowchart 1100 of a method of wireless communication. The method may be performed by a UE (e.g., the UE 104, 350, 402, 702, the apparatus 1504, etc.), which may include the memory 360 and which may correspond to the entire UE 104, 350, 402, 702 or apparatus 1504, or a component of the UE 104, 350, 402, 702 or the apparatus 1504, such as the TX processor 368, the RX processor 356, the controller/processor 359, the cellular baseband processor 1524, and/or the application processor 1506. The method may be performed to enhance wireless energy transfer between devices.

At 1102, the UE may report a capability of a UE to transmit an energy transfer signal on at least one of a downlink band of an FDD configuration or at least one of a downlink symbol or a downlink slot of a TDD configuration. For example, referring to FIG. 4, the UE 402 may report, at 406, a UE capability to transmit an energy transfer signal on downlink resources. The reporting, at 1102, may be performed by the downlink energy transfer component 198 of the apparatus 1504 in FIG. 15.

At 1104, the UE may report the capability of the UE to transmit the energy transfer signal and receive a downlink information signal on at least one of a same downlink band, a same downlink carrier band, or a same downlink BWP. For example, referring to FIG. 4, the report transmitted, at 406, from the UE 402 to the network entity 404 may include an indication of the UE capability to transmit the energy transfer signal on the downlink resources while receiving a downlink information signal from the network entity 404. The reporting, at 1104, may be performed by the downlink energy transfer component 198 of the apparatus 1504 in FIG. 15.

At 1106, the UE may receive a configuration for downlink resources in at least one of time or frequency. For example, referring to FIG. 4, the UE 402 may receive, at 408, a downlink/uplink resource configuration from the network entity 404. The reception, at 1106, may be performed by the downlink energy transfer component 198 of the apparatus 1504 in FIG. 15.

At 1108, the UE may receive a BWP configuration of a first BWP of at least one of a subband or a carrier band that is configured for the energy transfer signal and a second BWP of the at least one of the subband or the carrier band that is configured for the downlink information signal. For example, referring to FIG. 4, the downlink/uplink configuration received, at 408, by the UE 402 from the network entity 404 may be associated with a BWP configuration for the energy transfer signal and the downlink information signal. The reception, at 1108, may be performed by the downlink energy transfer component 198 of the apparatus 1504 in FIG. 15.

At 1110, the UE may receive at least one of semi-static scheduling or dynamic scheduling to transmit the energy transfer signal on the at least one of the downlink band of the FDD configuration or the at least one of the downlink symbol or the downlink slot of the TDD configuration. For example, referring to FIG. 4, the UE 402 may receive, at 410, scheduling for the energy transfer signal to be transmitted on the downlink resources by the UE 402. The reception, at 1110, may be performed by the downlink energy transfer component 198 of the apparatus 1504 in FIG. 15.

At 1112, the UE may transmit the energy transfer signal on one or more of the downlink resources. For example, referring to FIG. 4, the UE 402 may transmit, at 412a, the energy transfer signal to the network entity 404 on the downlink resources. The transmission, at 1112, may be performed by the downlink energy transfer component 198 of the apparatus 1504 in FIG. 15.

At 1114, the UE may receive the downlink information signal simultaneously with transmitting the energy transfer signal on the at least one of the downlink symbol or the downlink slot of the TDD configuration on the at least one of the subband or the carrier band. For example, referring to FIG. 4, the UE 402 may receive, at 412b, a downlink information signal from the network entity 404 simultaneously with transmitting, at 412a, the energy transfer signal to the network entity 404 on the downlink resources. The reception, at 1114, may be performed by the downlink energy transfer component 198 of the apparatus 1504 in FIG. 15.

At 1116, the UE may transmit an uplink information signal on an uplink band simultaneously with transmitting the energy transfer signal on the one or more of the downlink resources. For example, referring to FIG. 4, the UE 402 may transmit, at 412b, an uplink information signal to the network entity 404 simultaneously with transmitting, at 412a, the energy transfer signal to the network entity 404 on the downlink resources. The transmission, at 1116, may be performed by the downlink energy transfer component 198 of the apparatus 1504 in FIG. 15.

Figure 12:
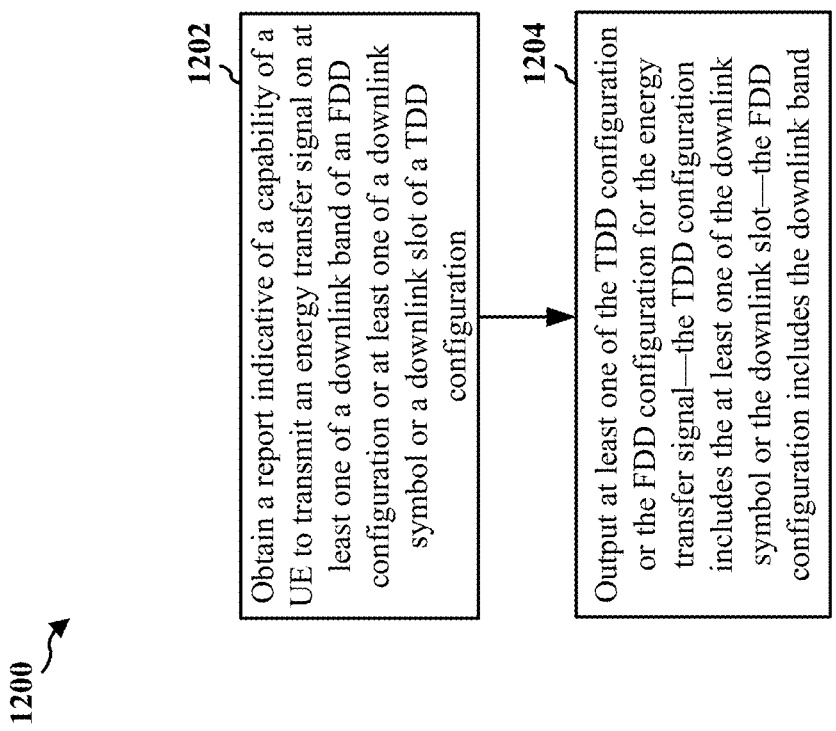
FIG. 12 is a flowchart of a method of wireless communication at a network entity, in accordance with various aspects of the present disclosure.

FIG. 12 is a flowchart 1200 of a method of wireless communication. The method may be performed by a network entity such as a base station or a component of a base station (e.g., the network entity 404, 1502, 1602; the base station 102, 310, 704; the CU 110; the DU 130; the RU 140, etc.), which may include the memory 376 and which may correspond to the entire network entity 404, 1502 or base station 102, 310, 704, or a component of the network entity 404, 1502 or the base station 102, 310, 704, such as the CU 110, the DU 130, the RU 140, the TX processor 316, the RX processor 370, and/or the controller/processor 375. The method may be performed to enhance wireless energy transfer between devices.

At 1202, the network entity or the base station may obtain a report indicative of a capability of a UE to transmit an energy transfer signal on at least one of a downlink band of an FDD configuration or at least one of a downlink symbol or a downlink slot of a TDD configuration. For example, referring to FIG. 4, the network entity 404 may obtain, at 406, a report from the UE 402 indicative of a UE capability to transmit an energy transfer signal on downlink resources. The obtaining of the report, at 1202, may be performed by the resource configuration component 199*a* of the network entity 1502 in FIG. 15.

At 1204, the network entity or the base station may output at least one of the TDD configuration or the FDD configuration for the energy transfer signal—the TDD configuration includes the at least one of the downlink symbol or the downlink slot—the FDD configuration includes the downlink band. For example, referring to FIG. 4, the network entity 404 may output, at 408, a downlink/uplink resource configuration for the UE 402. Referring to FIG. 8C, the downlink/uplink resource configuration may include a TDD configuration (e.g., as illustrated in association with the diagram 800) or an FDD configuration (e.g., as illustrated in association with the carrier diagrams 900-930). The outputting, at 1204, may be performed by the resource configuration component 199*a* of the network entity 1502 in FIG. 15.

Figure 13:
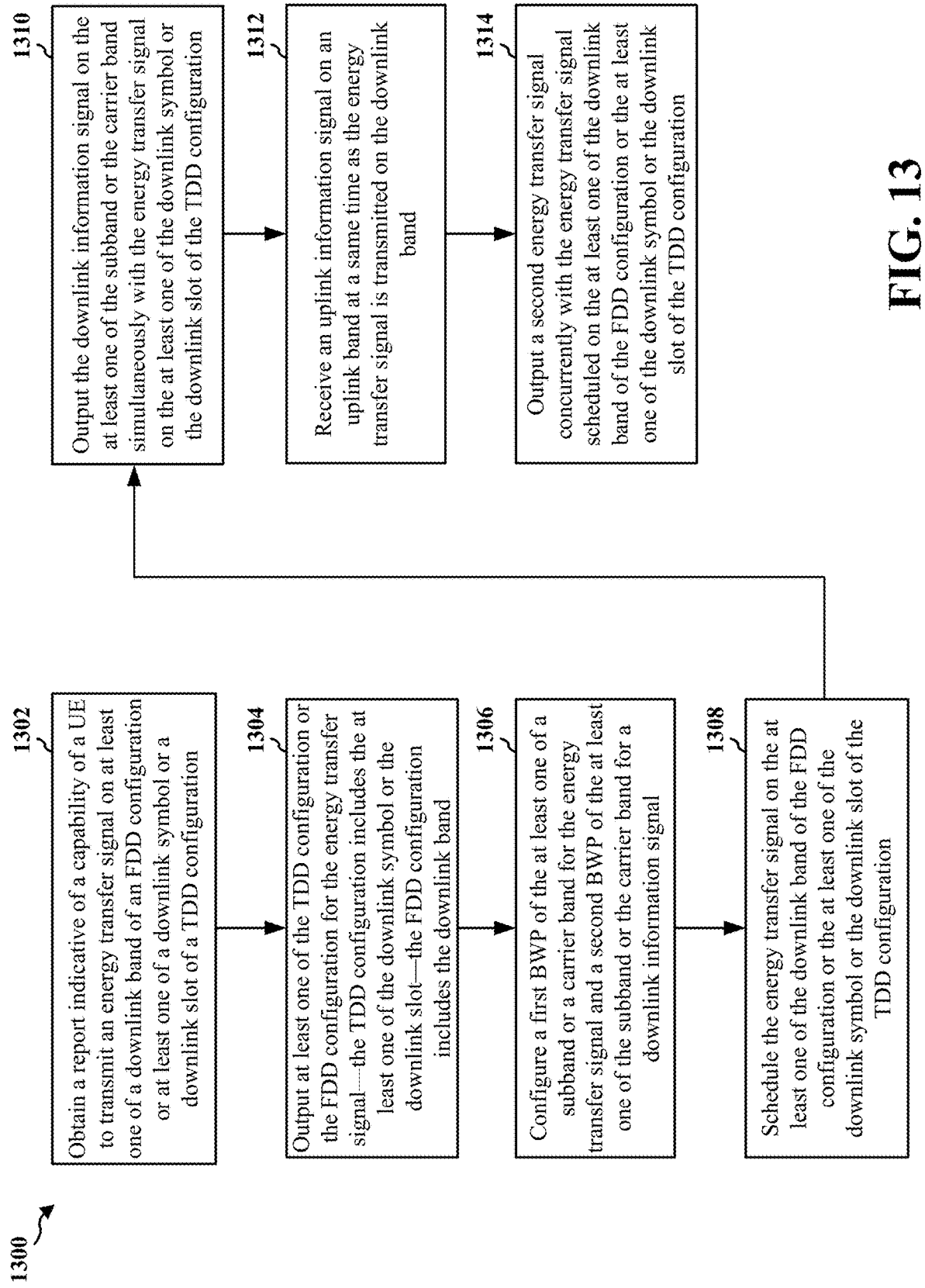
FIG. 13 is a flowchart of a method of wireless communication at a network entity, in accordance with various aspects of the present disclosure.

FIG. 13 is a flowchart 1300 of a method of wireless communication. The method may be performed by a network entity such as a base station or a component of a base station (e.g., the network entity 404, 1502, 1602; the base station 102, 310, 704; the CU 110; the DU 130; the RU 140, etc.), which may include the memory 376 and which may correspond to the entire network entity 404, 1502 or base station 102, 310, 704, or a component of the network entity 404, 1502 or the base station 102, 310, 704, such as the CU 110, the DU 130, the RU 140, the TX processor 316, the RX processor 370, and/or the controller/processor 375. The method may be performed to enhance wireless energy transfer between devices.

At 1302, the network entity or the base station may obtain a report indicative of a capability of a UE to transmit an energy transfer signal on at least one of a downlink band of an FDD configuration or at least one of a downlink symbol or a downlink slot of a TDD configuration. For example, referring to FIG. 4, the network entity 404 may obtain, at 406, a report from the UE 402 indicative of a UE capability to transmit an energy transfer signal on downlink resources. The obtaining of the report, at 1302, may be performed by the resource configuration component 199*a* of the network entity 1502 in FIG. 15.

At 1304, the network entity or the base station may output at least one of the TDD configuration or the FDD configuration for the energy transfer signal—the TDD configuration includes the at least one of the downlink symbol or the downlink slot—the FDD configuration includes the downlink band. For example, referring to FIG. 4, the network entity 404 may output, at 408, a downlink/uplink resource configuration for the UE 402. Referring to FIG. 8C, the downlink/uplink resource configuration may include a TDD configuration (e.g., as illustrated in association with the diagram 800) or an FDD configuration (e.g., as illustrated in association with the carrier diagrams 900-930). The outputting, at 1304, may be performed by the resource configuration component 199*a* of the network entity 1502 in FIG. 15.

At 1306, the network entity or the base station may configure a first BWP of the at least one of a subband or a carrier band for the energy transfer signal and a second BWP of the at least one of the subband or the carrier band for a downlink information signal. For example, referring to FIG. 4, the downlink/uplink resource configuration output, at 408, from the network entity 404 to the UE 402 may include a BWP configuration for the energy transfer signal and a downlink information signal. The configuration, at 1306, may be performed by the resource configuration component 199*a* of the network entity 1502 in FIG. 15.

At 1308, the network entity or the base station may schedule the energy transfer signal on the at least one of the downlink band of the FDD configuration or the at least one of the downlink symbol or the downlink slot of the TDD configuration. For example, referring to FIG. 4, the network entity 404 may transmit scheduling, at 410, for an energy transfer signal to be communicated from the UE 402 to the network entity 404 on downlink resources. The scheduling, at 1308, may be performed by the resource configuration component 199*a* of the network entity 1502 in FIG. 15.

At 1310, the network entity or the base station may output the downlink information signal on the at least one of the subband or the carrier band simultaneously with the energy transfer signal on the at least one of the downlink symbol or the downlink slot of the TDD configuration. For example, referring to FIG. 4, the network entity 404 may output, at 412*b*, a downlink information signal to the UE 402 simultaneously with receiving, at 412*a*, the energy transfer signal on downlink resources from the UE 402. The outputting, at 1310, may be performed by the resource configuration component 199*a* of the network entity 1502 in FIG. 15.

At 1312, the network entity or the base station may receive an uplink information signal on an uplink band at a same time as the energy transfer signal is transmitted on the downlink band. For example, referring to FIG. 4, the network entity 404 may receive, at 412*b*, an uplink information signal from the UE 402 simultaneously with receiving, at 412*a*, the energy transfer signal on downlink resources from the UE 402. The reception, at 1312, may be performed by the resource configuration component 199*a* of the network entity 1502 in FIG. 15.

At 1314, the network entity or the base station may output a second energy transfer signal concurrently with the energy transfer signal scheduled on the at least one of the downlink band of the FDD configuration or the at least one of the downlink symbol or the downlink slot of the TDD configuration. For example, referring to FIG. 4, the network entity 404 may output, at 414, an energy transfer signal on downlink/uplink resources simultaneously with receiving, at 412*a*, the energy transfer signal on downlink resources from the UE 402. The outputting, at 1314, may be performed by the resource configuration component 199*a* of the network entity 1502 in FIG. 15.

Figure 14:
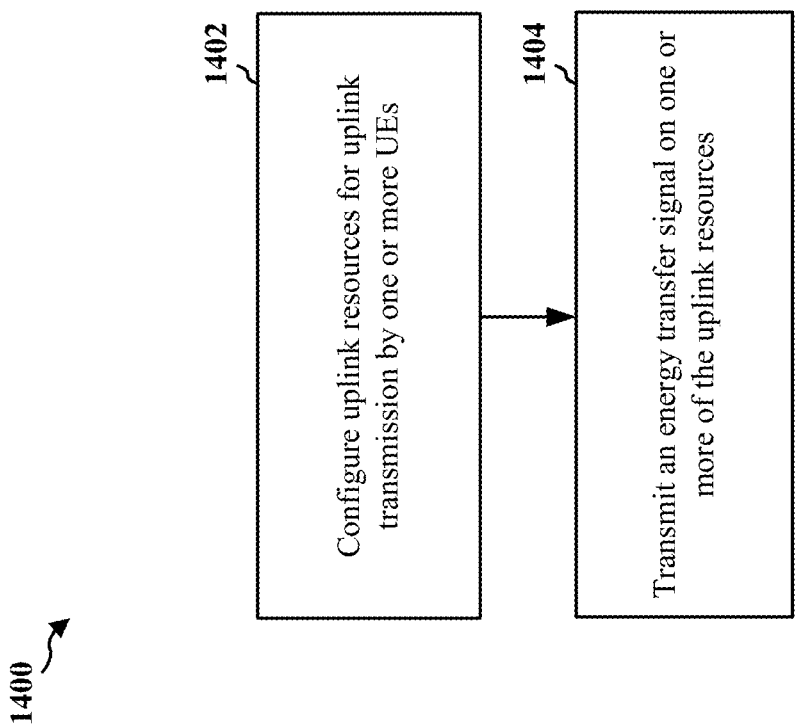
FIG. 14 is a flowchart of a method of wireless communication at a network entity, in accordance with various aspects of the present disclosure.

FIG. 14 is a flowchart 1400 of a method of wireless communication. The method may be performed by a network entity or a base station (e.g., the network entity 404, 1502, the base station 102, 310, 704, the CU 110, the DU 130, the RU 140, etc.), which may include the memory 376 and which may correspond to the entire network entity 404, 1502 or base station 102, 310, 704, or a component of the network entity 404, 1502 or the base station 102, 310, 704, such as the CU 110, the DU 130, the RU 140, the TX processor 316, the RX processor 370, and/or the controller/processor 375. The method may be performed to enhance wireless energy transfer between devices.

At 1402, the network entity or the base station may configure uplink resources for uplink transmission by one or more UEs. For example, referring to FIG. 4, the network entity 404 may configure, at 408, downlink/uplink resources for the UE 402. The configuration, at 1402, may be performed by the uplink energy transfer component 199b of the network entity 1502 in FIG. 15.

At 1404, the network entity or the base station may transmit an energy transfer signal on one or more of the uplink resources. For example, referring to FIG. 4, the network entity 404 may transmit, at 414, an energy transfer signal to the UE 402 on downlink/uplink resources. The transmission, at 1404, may be performed by the uplink energy transfer component 199b of the network entity 1502 in FIG. 15.

Figure 15:
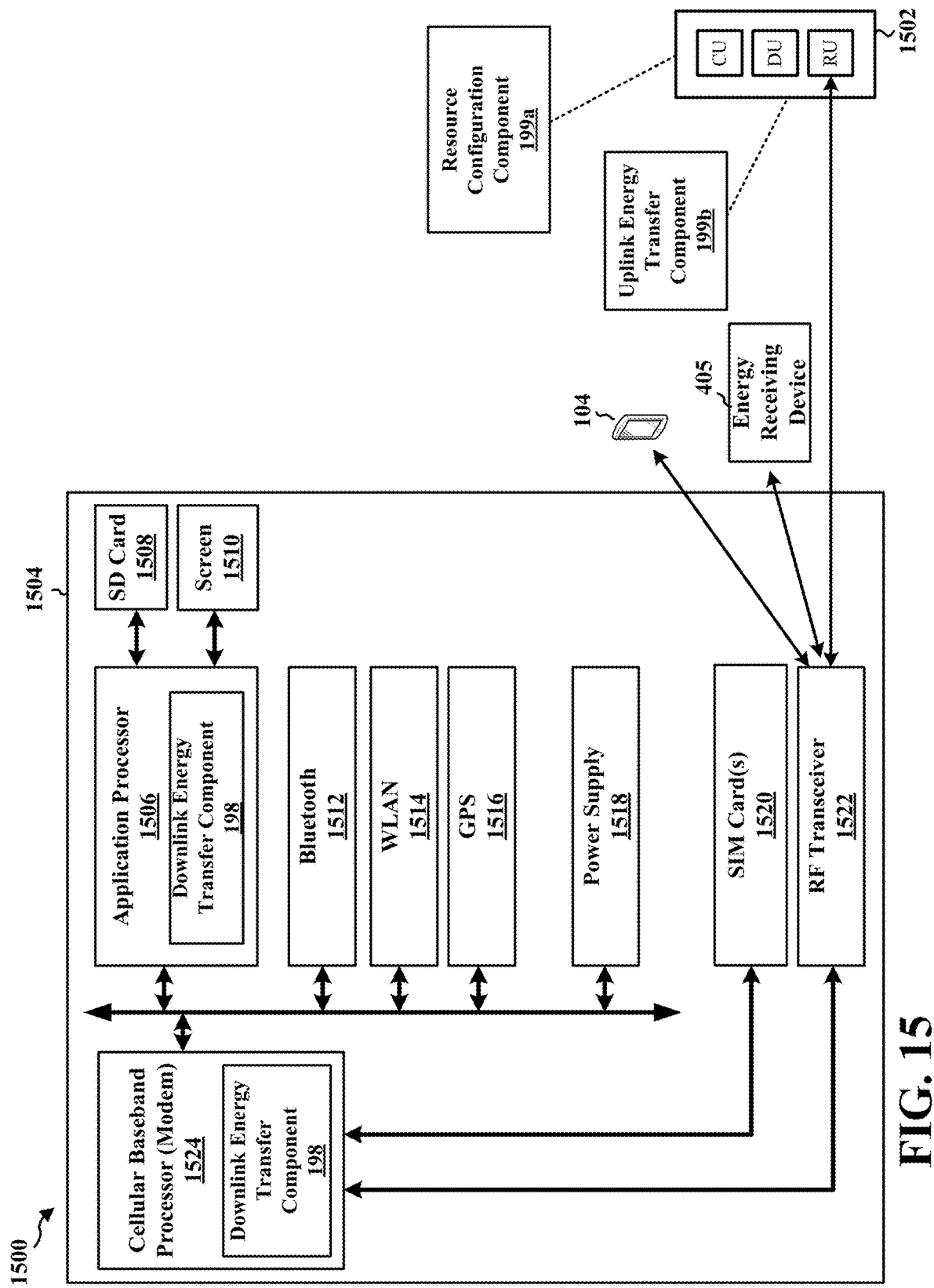
FIG. 15 is a diagram illustrating an example of a hardware implementation for an example apparatus and/or network entity, in accordance with various aspects of the present disclosure.

FIG. 15 is a diagram 1500 illustrating an example of a hardware implementation for an apparatus 1504 and a network entity 1502. The apparatus 1504 may be a UE, a component of a UE, or may implement UE functionality. The network entity 1502 may be a BS, a component of a BS, or may implement BS functionality. In some aspects, the apparatus 1504 may include a cellular baseband processor 1524 (also referred to as a modem) coupled to a cellular RF transceiver 1522. In some aspects, the apparatus 1504 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1524 communicates through the cellular RF transceiver 1522 with the UE 104 and/or with an RU associated with the network entity 1502. The RU is either part of the network entity 1502 or is in communication with the network entity 1502. The network entity 1502 may include one or more of the CU, DU, and the RU. The cellular baseband processor 1524 and the application processor 1506 may each include a computer-readable medium/memory. Each computer-readable medium/memory may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed supra, the downlink energy transfer component 198 is configured to receive a configuration for downlink resources in at least one of time or frequency; and transmit an energy transfer signal on one or more of the downlink resources. The downlink energy transfer component 198 may be within the cellular baseband processor 1524, the application processor 1506, or both the cellular baseband processor 1524 and the application processor 1506. The downlink energy transfer component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1504 may include a variety of components configured for various functions. In one configuration, the apparatus 1504, and in particular the cellular baseband processor 1524 and/or the application processor 1506, includes means for receiving a configuration for downlink resources in at least one of time or frequency; and means for transmitting an energy transfer signal on one or more of the downlink resources. The means for transmitting the energy transfer signal on one or more of the downlink resources is further configured to transmit on at least one of the downlink band of the FDD configuration or the at least one of the downlink symbol or the downlink slot of the TDD configuration. The apparatus 1504 further includes means for receiving at least one of semi-static scheduling or dynamic scheduling to transmit the energy transfer signal on the at least one of the downlink band of the FDD configuration or the at least one of the downlink symbol or the downlink slot of the TDD configuration. The means for transmitting the energy transfer signal is further configured to transmit the energy transfer signal concurrently with a second energy transfer signal of a network entity. The apparatus 1504 further includes means for reporting a capability of the UE to transmit the energy transfer signal on the at least one of the downlink band of the FDD configuration or the at least one of the downlink symbol or the downlink slot of the TDD configuration. The apparatus 1504 further includes means for receiving a downlink information signal simultaneously with transmitting the energy transfer signal on the at least one of the downlink symbol or the downlink slot of the TDD configuration on at least one of a subband or a carrier band. The apparatus 1504 further includes means for receiving a BWP configuration of a first BWP of the at least one of the subband or the carrier band that is configured for the energy transfer signal and a second BWP of the at least one of the subband or the carrier band that is configured for the downlink information signal. The apparatus 1504 further includes means for reporting a capability of the UE to transmit the energy transfer signal and receive a downlink information signal on at least one of a same downlink band, a same downlink carrier band, or a same downlink BWP. The apparatus 1504 further includes means for transmitting an uplink information signal on an uplink band simultaneously with transmitting the energy transfer signal on the one or more of the downlink resources.

The means may be the downlink energy transfer component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the resource configuration component 199a is configured to obtain a report indicative of a capability of a UE to transmit an energy transfer signal on at least one of a downlink band of an FDD configuration or at least one of a downlink symbol or a downlink slot of a TDD configuration; and output at least one of the TDD configuration or the FDD configuration for the energy transfer signal, the TDD configuration including the at least one of the downlink symbol or the downlink slot, the FDD configuration including the downlink band. The resource configuration component 199a may be within one or more processors (e.g., BBU(s)) of one or more of the CU, DU, and the RU. The resource configuration component 199a may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 1502 may include a variety of components configured for various functions. In one configuration, the network entity 1502 includes means for obtaining a report indicative of a capability of a UE to transmit an energy transfer signal on at least one of a downlink band of an FDD configuration or at least one of a downlink symbol or a downlink slot of a TDD configuration; and means for outputting at least one of the TDD configuration or the FDD configuration for the energy transfer signal, the TDD configuration including the at least one of the downlink symbol or the downlink slot, the FDD configuration including the downlink band. The network entity 1502 further includes means for scheduling the energy transfer signal on the at least one of the downlink band of the FDD configuration or the at least one of the downlink symbol or the downlink slot of the TDD configuration. The network entity 1502 further includes means for outputting a second energy transfer signal concurrently with the energy transfer signal scheduled on the at least one of the downlink band of the FDD configuration or the at least one of the downlink symbol or the downlink slot of the TDD configuration. The network entity 1502 further includes means for outputting a downlink information signal on at least one of a subband or a carrier band simultaneously with the energy transfer signal on the at least one of the downlink symbol or the downlink slot of the TDD configuration. The network entity 1502 further includes means for configuring a first BWP of the at least one of the subband or the carrier band for the energy transfer signal and a second BWP of the at least one of the subband or the carrier band for the downlink information signal. The network entity 1502 further includes means for receiving an uplink information signal on an uplink band at a same time as the energy transfer signal is transmitted on the downlink band.

The means may be the resource configuration component 199a of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the uplink energy transfer component 199b is configured to configure uplink resources for uplink transmission by one or more UEs; and transmit an energy transfer signal on one or more of the uplink resources. The uplink energy transfer component 199b may be within one or more processors (e.g., BBU(s)) of one or more of the CU, DU, and the RU. The uplink energy transfer component 199b may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 1502 may include a variety of components configured for various functions. In one configuration, the network entity 1502 includes means for configuring uplink resources for uplink transmission by one or more UEs; and means for transmitting an energy transfer signal on one or more of the uplink resources. The means may be the uplink energy transfer component 199b of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Figure 16:
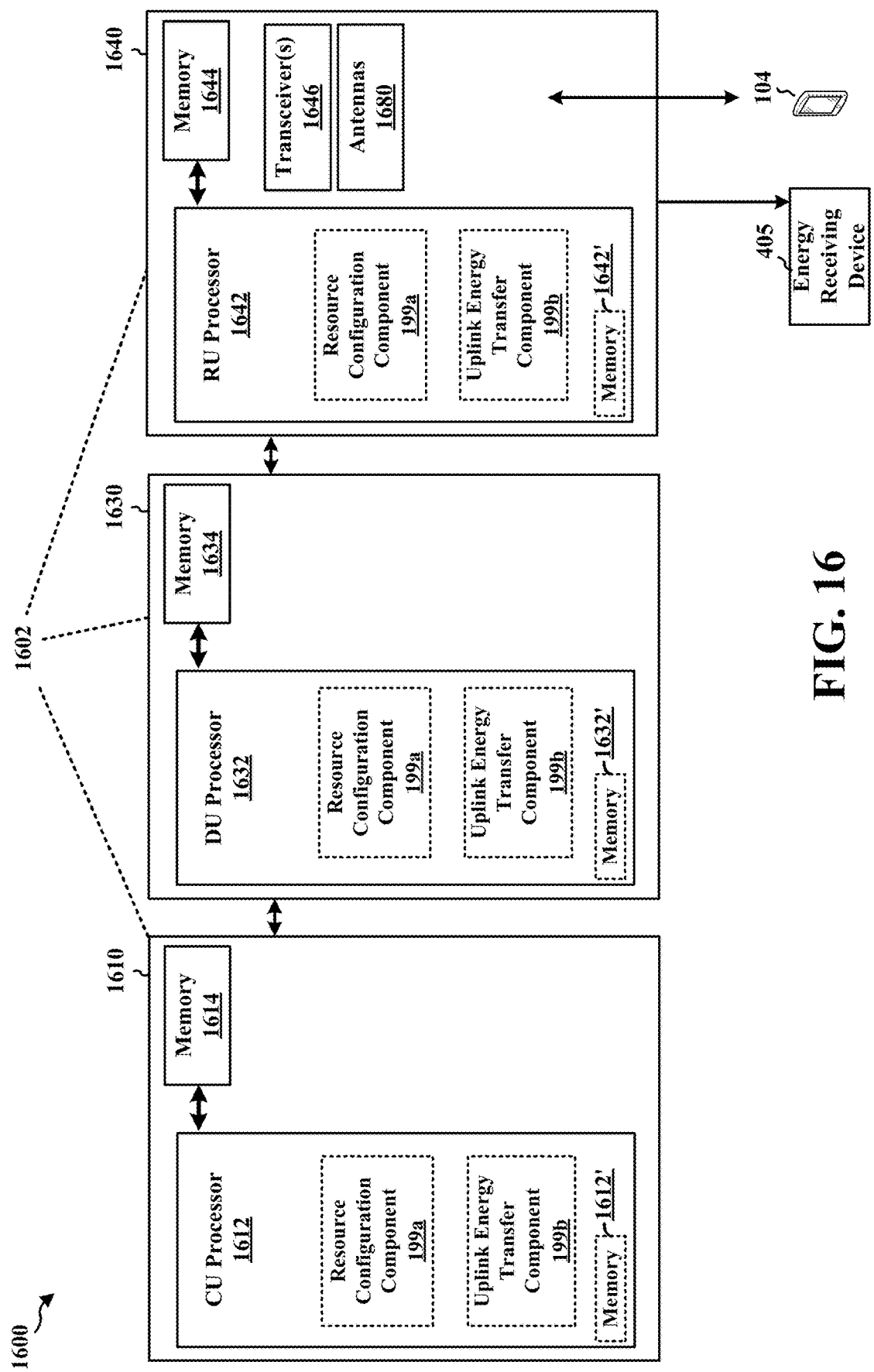
FIG. 16 is a diagram illustrating an example of a hardware implementation for an example apparatus and/or network entity, in accordance with various aspects of the present disclosure.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the components 199a and/or 199b, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614. The CU 1610 communicates with the DU 1630. The DU 1630 may include a DU processor 1632. The DU processor 1632 may include on-chip memory 1632'. In some aspects, the DU 1630 may further include additional memory modules 1634. The DU 1630 communicates with the RU 1640. The RU 1640 may include an RU processor 1642. The RU processor 1642 may include on-chip memory 1642'. In some aspects, the RU 1640 may further include additional memory modules 1644, one or more transceivers 1646, and antennas 1680. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199a is configured to obtain a report indicative of a capability of a UE to transmit an energy transfer signal on at least one of a downlink band of a FDD configuration or at least one of a downlink symbol or a downlink slot of a TDD configuration; and output at least one of the TDD configuration or the FDD configuration for the energy transfer signal, the TDD configuration including the at least one of the downlink symbol or the downlink slot, the FDD configuration including the downlink band. An uplink energy transfer component 199b may be configured to configure uplink resources for uplink transmission by one or more UEs; and transmit an energy transfer signal on one or more of the uplink resources. The components 199a and/or 199b may be within one or more processors of one or more of the CU 1610, DU 1630, and the RU 1640. The components 199a and/or 199b may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for means for obtaining a report indicative of a capability of a UE to transmit an energy transfer signal on at least one of a downlink band of an FDD configuration or at least one of a downlink symbol or a downlink slot of a TDD configuration; and means for outputting at least one of the TDD configuration or the FDD configuration for the energy transfer signal, the TDD configuration including the at least one of the downlink symbol or the downlink slot, the FDD configuration including the downlink band. The network entity 1602 further includes means for scheduling the energy transfer signal on the at least one of the downlink band of the FDD configuration or the at least one of the downlink symbol or the downlink slot of the TDD configuration. The network entity 1602 further includes means for outputting a second energy transfer signal concurrently with the energy transfer signal scheduled on the at least one of the downlink band of the FDD configuration or the at least one of the downlink symbol or the downlink slot of the TDD configuration. The network entity 1602 further includes means for outputting a downlink information signal on at least one of a subband or a carrier band simultaneously with the energy transfer signal on the at least one of the downlink symbol or the downlink slot of the TDD configuration. The network entity 1602 further includes means for configuring a first BWP of the at least one of the subband or the carrier band for the energy transfer signal and a second BWP of the at least one of the subband or the carrier band for the downlink information signal. The network entity 1602 further includes means for receiving an uplink information signal on an uplink band at a same time as the energy transfer signal is transmitted on the downlink band. The means may be the components 199a and/or 199b of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method of wireless communication at a UE, including: receiving a configuration for downlink resources in at least one of time or frequency; and transmitting an energy transfer signal on one or more of the downlink resources.

Aspect 2 may be combined with aspect 1 and includes that the configuration for the downlink resources includes at least one of a TDD configuration or an FDD configuration, the TDD configuration including at least one of a downlink symbol or a downlink slot, the FDD configuration including a downlink band, where transmitting the energy transfer signal on one or more of the downlink resources includes transmitting on at least one of the downlink band of the FDD configuration or the at least one of the downlink symbol or the downlink slot of the TDD configuration.

Aspect 3 may be combined with any of aspects 1-2 and further includes receiving at least one of semi-static scheduling or dynamic scheduling to transmit the energy transfer signal on the at least one of the downlink band of the FDD configuration or the at least one of the downlink symbol or the downlink slot of the TDD configuration.

Aspect 4 may be combined with any of aspects 1-3 and further includes transmitting the energy transfer signal includes transmitting the energy transfer signal concurrently with a second energy transfer signal of a network entity.

Aspect 5 may be combined with any of aspects 1-4 and includes that the downlink resources include a flexible symbol of the TDD configuration.

Aspect 6 may be combined with any of aspects 1-5 and further includes reporting a capability of the UE to transmit the energy transfer signal on the at least one of the downlink band of the FDD configuration or the at least one of the downlink symbol or the downlink slot of the TDD configuration.

Aspect 7 may be combined with any of aspects 1-6 and includes that the UE transmits the energy transfer signal based on at least one of a half-duplex capability, a full-duplex capability, a subband full-duplex capability, a beamforming capability, a number of antennas, a transmit power, a maximum deliverable energy, or a maximum energy transfer duration.

Aspect 8 may be combined with any of aspects 1-7 and includes that the half-duplex capability supports reception of a downlink information signal or transmission of the energy transfer signal on the at least one of the downlink symbol or the downlink slot of the TDD configuration at separate times.

Aspect 9 may be combined with any of aspects 1-8 and further includes receiving a downlink information signal simultaneously with transmitting the energy transfer signal on the at least one of the downlink symbol or the downlink slot of the TDD configuration on at least one of a subband or a carrier band.

Aspect 10 may be combined with any of aspects 1-9 and further includes receiving a BWP configuration of a first BWP of the at least one of the subband or the carrier band that is configured for the energy transfer signal and a second BWP of the at least one of the subband or the carrier band that is configured for the downlink information signal.

Aspect 11 may be combined with any of aspects 1-10 and includes that the full-duplex capability supports at least one of simultaneous energy transfer signal transmission with reception of a downlink information signal on a same carrier band or transmission of the energy transfer signal on a first carrier band simultaneously with the reception of the downlink information signal on a second carrier band.

Aspect 12 may be combined with any of aspects 1-11 and further includes reporting a capability of the UE to transmit the energy transfer signal and receive a downlink information signal on at least one of a same downlink band, a same downlink carrier band, or a same downlink BWP.

Aspect 13 may be combined with any of aspects 1-12 and further includes transmitting an uplink information signal on an uplink band simultaneously with transmitting the energy transfer signal on the one or more of the downlink resources.

Aspect 14 may be combined with any of aspects 1-13 and includes that the energy transfer signal is transmitted to an RFID tag.

Aspect 15 is a method of wireless communication at a network entity, including:
obtaining a report indicative of a capability of a UE to transmit an energy transfer signal on at least one of a downlink band of an FDD configuration or at least one of a downlink symbol or a downlink slot of a TDD configuration; and outputting at least one of the TDD configuration or the FDD configuration for the energy transfer signal, the TDD configuration including the at least one of the downlink symbol or the downlink slot, the FDD configuration including the downlink band.

Aspect 16 may be combined with aspect 15 and further includes scheduling the energy transfer signal on the at least one of the downlink band of the FDD configuration or the at least one of the downlink symbol or the downlink slot of the TDD configuration.

Aspect 17 may be combined with any of aspects 15-16 and further includes outputting a second energy transfer signal concurrently with the energy transfer signal scheduled on the at least one of the downlink band of the FDD configuration or the at least one of the downlink symbol or the downlink slot of the TDD configuration.

Aspect 18 may be combined with any of aspects 15-17 and includes that downlink resources for use by the UE to transmit the energy transfer signal include a flexible symbol of the TDD configuration.

Aspect 19 may be combined with any of aspects 15-18 and includes that the report is indicative of at least one of a half-duplex capability, a full-duplex capability, a subband full-duplex capability, a beamforming capability, a number of antennas, a transmit power, a maximum deliverable energy, or a maximum energy transfer duration.

Aspect 20 may be combined with any of aspects 15-19 and includes that the half-duplex capability corresponds to support for transmission of a downlink information signal at a separate time from the energy transfer signal on the at least one of the downlink symbol or the downlink slot of the TDD configuration.

Aspect 21 may be combined with any of aspects 15-20 and further includes outputting a downlink information signal on at least one of a subband or a carrier band simultaneously with the energy transfer signal on the at least one of the downlink symbol or the downlink slot of the TDD configuration.

Aspect 22 may be combined with any of aspects 15-21 and further includes configuring a first BWP of the at least one of the subband or the carrier band for the energy transfer signal and a second BWP of the at least one of the subband or the carrier band for the downlink information signal.

Aspect 23 may be combined with any of aspects 15-22 and includes that the full-duplex capability corresponds to support for simultaneous transmission of a downlink information signal with the energy transfer signal on a same carrier band or transmission of the downlink information signal on a second carrier band simultaneously with an energy transfer signal transmission on a first carrier band.

Aspect 24 may be combined with any of aspects 15-23 and includes that the report is indicative of the capability of the UE to transmit the energy transfer signal and receive a downlink information signal on at least one of a same downlink band, a same downlink carrier band, or a same downlink BWP.

Aspect 25 may be combined with any of aspects 15-24 and further includes receiving an uplink information signal on an uplink band at a same time as the energy transfer signal is transmitted on the downlink band.

Aspect 26 may be combined with any of aspects 15-25 and includes that the energy transfer signal is associated with an RFID tag.

Aspect 27 is a method of wireless communication at a network entity, including: configuring uplink resources for uplink transmission by one or more UEs; and transmitting an energy transfer signal on one or more of the uplink resources.

Aspect 28 may be combined with aspect 27 and includes that configuring the uplink resources includes configuring at least one of a TDD pattern or an FDD pattern, the TDD pattern including at least one of an uplink symbol or an uplink slot, the FDD pattern including an uplink band, wherein the UE transmits the energy transfer signal on at least one of the uplink band of the FDD pattern or the at least one of the uplink symbol or the uplink slot of the TDD pattern.

Aspect 29 is an apparatus for wireless communication for implementing a method as in any of aspects 1-28.

Aspect 30 is an apparatus for wireless communication including means for implementing a method as in any of aspects 1-28.

Aspect 31 may be combined with any of aspects 29-30 and further includes at least one of a transceiver or an antenna coupled to at least one processor of the apparatus.

Aspect 32 is a non-transitory computer-readable medium storing computer executable code, the code when executed by at least one processor causes the at least one processor to implement a method as in any of aspects 1-28.

What is claimed is:

1. An apparatus for wireless communication at a user equipment (UE), comprising:
   a memory; and
   at least one processor coupled to the memory and, based at least in part on information stored in the memory, the at least one processor is configured to:
      receive a configuration for downlink resources in at least one of time or frequency; and
      transmit an energy transfer signal on one or more of the downlink resources.

2. The apparatus of claim 1, wherein the configuration for the downlink resources includes at least one of a time division duplex (TDD) configuration or a frequency division duplex (FDD) configuration, the TDD configuration including at least one of a downlink symbol or a downlink slot, the FDD configuration including a downlink band,
   wherein to transmit the energy transfer signal on one or more of the downlink resources the at least one processor is further configured to transmit on at least one of the downlink band of the FDD configuration or the at least one of the downlink symbol or the downlink slot of the TDD configuration.

3. The apparatus of claim 2, wherein the at least one processor is further configured to receive at least one of semi-static scheduling or dynamic scheduling to transmit the energy transfer signal on the at least one of the downlink band of the FDD configuration or the at least one of the downlink symbol or the downlink slot of the TDD configuration.

4. The apparatus of claim 2, wherein to transmit the energy transfer signal the at least one processor is further configured to transmit the energy transfer signal concurrently with a second energy transfer signal of a network entity.

5. The apparatus of claim 2, wherein the downlink resources include a flexible symbol of the TDD configuration.

6. The apparatus of claim 2, wherein the at least one processor is further configured to report a capability of the UE to transmit the energy transfer signal on the at least one of the downlink band of the FDD configuration or the at least one of the downlink symbol or the downlink slot of the TDD configuration.

7. The apparatus of claim 2, wherein the UE transmits the energy transfer signal based on at least one of a half-duplex capability, a full-duplex capability, a subband full-duplex capability, a beamforming capability, a number of antennas, a transmit power, a maximum deliverable energy, or a maximum energy transfer duration.

8. The apparatus of claim 7, wherein the half-duplex capability supports reception of a downlink information signal or transmission of the energy transfer signal on the at least one of the downlink symbol or the downlink slot of the TDD configuration at separate times.

9. The apparatus of claim 7, wherein the at least one processor is further configured to receive a downlink information signal simultaneously with transmission of the energy transfer signal on the at least one of the downlink symbol or the downlink slot of the TDD configuration on at least one of a subband or a carrier band.

10. The apparatus of claim 9, wherein the at least one processor is further configured to receive a bandwidth part (BWP) configuration of a first BWP of the at least one of the subband or the carrier band that is configured for the energy transfer signal and a second BWP of the at least one of the subband or the carrier band that is configured for the downlink information signal.

11. The apparatus of claim 7, wherein the full-duplex capability supports at least one of simultaneous energy transfer signal transmission with reception of a downlink information signal on a same carrier band or transmission of the energy transfer signal on a first carrier band simultaneous with the reception of the downlink information signal on a second carrier band.

12. The apparatus of claim 1, wherein the at least one processor is further configured to report a capability of the UE to transmit the energy transfer signal and receive a downlink information signal on at least one of a same downlink band, a same downlink carrier band, or a same downlink bandwidth part (BWP).

13. The apparatus of claim 1, wherein the at least one processor is further configured to transmit an uplink information signal on an uplink band simultaneously with transmission of the energy transfer signal on the one or more of the downlink resources.

14. The apparatus of claim 1, wherein the energy transfer signal is transmitted to a radio frequency identification (RFID) tag.

15. An apparatus for wireless communication at a network entity, comprising:
   a memory; and
   at least one processor coupled to the memory and, based at least in part on information stored in the memory, the at least one processor is configured to:
      obtain a report indicative of a capability of a user equipment (UE) to transmit an energy transfer signal on at least one of a downlink band of a frequency division duplex (FDD) configuration or at least one of a downlink symbol or a downlink slot of a time division duplex (TDD) configuration; and output at least one of the TDD configuration or the FDD configuration for the energy transfer signal, the TDD configuration including the at least one of the downlink symbol or the downlink slot, the FDD configuration including the downlink band.

16. The apparatus of claim 15, wherein the at least one processor is further configured to schedule the energy transfer signal on the at least one of the downlink band of the FDD configuration or the at least one of the downlink symbol or the downlink slot of the TDD configuration.

17. The apparatus of claim 16, wherein the at least one processor is further configured to output a second energy transfer signal concurrently with the energy transfer signal scheduled on the at least one of the downlink band of the FDD configuration or the at least one of the downlink symbol or the downlink slot of the TDD configuration.

18. The apparatus of claim 15, wherein downlink resources for use by the UE to transmit the energy transfer signal include a flexible symbol of the TDD configuration.

19. The apparatus of claim 15, wherein the report is indicative of at least one of a half-duplex capability, a full-duplex capability, a subband full-duplex capability, a beamforming capability, a number of antennas, a transmit power, a maximum deliverable energy, or a maximum energy transfer duration.

20. The apparatus of claim 19, wherein the half-duplex capability corresponds to support for transmission of a downlink information signal at a separate time from the energy transfer signal on the at least one of the downlink symbol or the downlink slot of the TDD configuration.

21. The apparatus of claim 19, wherein the at least one processor is further configured to output a downlink information signal on at least one of a subband or a carrier band simultaneously with the energy transfer signal on the at least one of the downlink symbol or the downlink slot of the TDD configuration.

22. The apparatus of claim 21, wherein the at least one processor is further configured to configure a first bandwidth part (BWP) of the at least one of the subband or the carrier band for the energy transfer signal and a second BWP of the at least one of the subband or the carrier band for the downlink information signal.

23. The apparatus of claim 19, wherein the full-duplex capability corresponds to support for simultaneous transmission of a downlink information signal with the energy transfer signal on a same carrier band or transmission of the downlink information signal on a second carrier band simultaneously with an energy transfer signal transmission on a first carrier band.

24. The apparatus of claim 15, wherein the report is indicative of the capability of the UE to transmit the energy transfer signal and receive a downlink information signal on at least one of a same downlink band, a same downlink carrier band, or a same downlink bandwidth part (BWP).

25. The apparatus of claim 15, wherein the at least one processor is further configured to receive an uplink information signal on an uplink band at a same time as the energy transfer signal is transmitted on the downlink band.

26. The apparatus of claim 15, wherein the energy transfer signal is associated with a radio frequency identification (RFID) tag.

27. An apparatus for wireless communication at a network entity, comprising:
    a memory; and
    at least one processor coupled to the memory and, based at least in part on information stored in the memory, the at least one processor is configured to:
        configure uplink resources for uplink transmission by one or more user equipments (UEs); and
        transmit an energy transfer signal on one or more of the uplink resources.

28. The apparatus of claim 27, wherein to configure the uplink resources the at least one processor is further configured to configure at least one of a time division duplex (TDD) pattern or a frequency division duplex (FDD) pattern, the TDD pattern including at least one of an uplink symbol or an uplink slot, the FDD pattern including an uplink band, and wherein to transmit the energy transfer signal, the at least one processor is further configured to transmits the energy transfer signal on at least one of the uplink band of the FDD pattern or the at least one of the uplink symbol or the uplink slot of the TDD pattern.

29. A method of wireless communication at a user equipment (UE), comprising:
    receiving a configuration for downlink resources in at least one of time or frequency; and
    transmitting an energy transfer signal on one or more of the downlink resources.

30. The method of claim 29, wherein the configuration for the downlink resources includes at least one of a time division duplex (TDD) configuration or a frequency division duplex (FDD) configuration, the TDD configuration including at least one of a downlink symbol or a downlink slot, the FDD configuration including a downlink band,
    wherein transmitting the energy transfer signal on one or more of the downlink resources includes transmitting on at least one of the downlink band of the FDD configuration or the at least one of the downlink symbol or the downlink slot of the TDD configuration.

* * * * *